US 8,202,233 B2

(12) United States Patent
Yasuhara

(10) Patent No.: US 8,202,233 B2
(45) Date of Patent: Jun. 19, 2012

(54) MOTION GUIDE DEVICE, ITS CONTROL SYSTEM AND CONTROL PROGRAM

(75) Inventor: Ken Yasuhara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 713 days.

(21) Appl. No.: 12/064,892

(22) PCT Filed: Jul. 12, 2006

(86) PCT No.: PCT/JP2006/313864
§ 371 (c)(1),
(2), (4) Date: Feb. 26, 2008

(87) PCT Pub. No.: WO2007/026472
PCT Pub. Date: Mar. 8, 2007

(65) Prior Publication Data
US 2009/0192414 A1    Jul. 30, 2009

(30) Foreign Application Priority Data
Aug. 29, 2005  (JP) ................................ 2005-248432

(51) Int. Cl.
*A61B 5/00*  (2006.01)

(52) U.S. Cl. ...................................................... 600/595

(58) Field of Classification Search .................. 600/587, 600/595
See application file for complete search history.

(56) References Cited

U.S. PATENT DOCUMENTS

| 2003/0120183 A1* | 6/2003 | Simmons ....................... 600/595 |
| 2005/0177080 A1* | 8/2005 | Yasuhara et al. ................. 602/16 |
| 2005/0219040 A1* | 10/2005 | Dryer ........................ 340/384.71 |

FOREIGN PATENT DOCUMENTS

| EP | 1547567 A1 * | 6/2005 |
| EP | 1547567 A1 | 6/2005 |
| JP | 08-278786 | 10/1996 |
| JP | 2003-135543 | 5/2003 |
| JP | 2004-073649 | 3/2004 |
| JP | 2005-224318 | 8/2005 |
| WO | WO-2004/017890 * | 3/2004 |
| WO | WO 2004017890 A1 * | 3/2004 |

* cited by examiner

*Primary Examiner* — Max Hindenburg
*Assistant Examiner* — Michael C Stout
(74) *Attorney, Agent, or Firm* — Rankin, Hill & Clark LLP

(57) ABSTRACT

A device for inducing a user's motion such that the user's motion rhythm and scale coincide, respectively, with a target rhythm and scale is provided. According to the inventive motion induction device, a first oscillator is generated which attains mutual entrainment with a motion oscillator in such a way as to reflect a natural angular velocity $\omega_M$. A new natural angular velocity $\omega_M$ is set based on a phase difference (first phase difference) $\theta_{HM}$ between the motion oscillator and the first oscillator. Further, a second oscillator is generated based on the new natural angular velocity $\omega_M$. An induction oscillator is then generated which includes a first induction oscillator, the first induction oscillator including the second oscillator and a first potential which brings the value of the motion oscillator responsive to the user's motion scale close to its target value according to the natural angular velocity $\omega_M$.

17 Claims, 9 Drawing Sheets

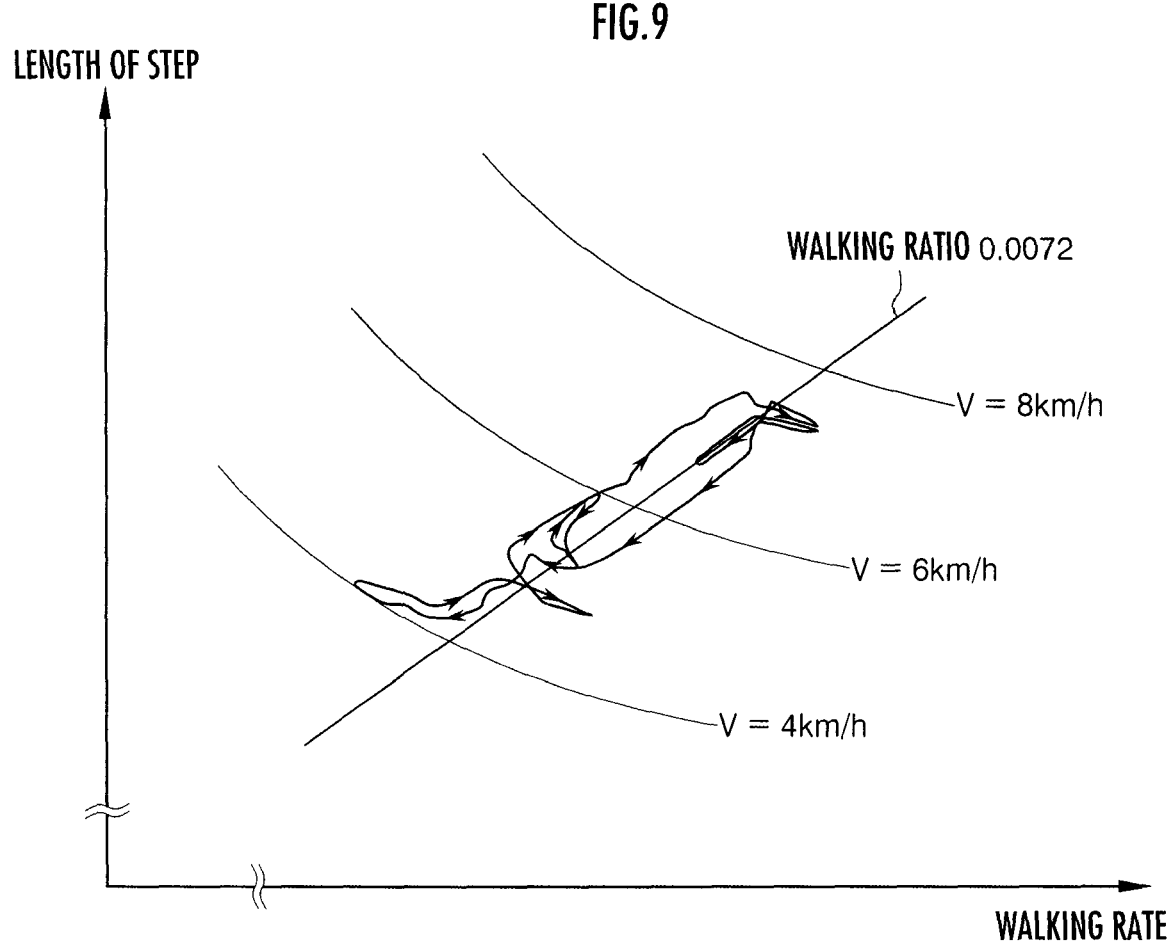

MOTION GUIDE DEVICE, ITS CONTROL SYSTEM AND CONTROL PROGRAM

TECHNICAL FIELD

The present invention relates to a device for inducing a user's motion, a system for controlling the device, and a program for providing a computer attached to the device with functions for controlling the device.

BACKGROUND ART

There has been suggested a device which assists a user in walking by applying a torque around a leg joint (hip joint, knee joint, or ankle joint) to a user's body (for example, see Japanese Patent Laid-Open No. 2003-135543). In addition, there has been suggested a system which controls the walking assist device in such a way as to add autonomy to the walking assist rhythm of the walking assist device while following changes in the user's locomotion rhythm (for example, see Japanese Patent Laid-Open No. 2004-073649).

DISCLOSURE OF THE INVENTION

Problem to be Solved by the Invention

However, even if the walking assist rhythm by the walking assist device is appropriate, if there is an excess or deficiency in assist force or its working distance, the length of a step or a leg joint angle may become too big or too small, thereby making the user feel uncomfortable or insecure. For example, if the user wishes to walk slowly with small steps, the user may feel uncomfortable if the step becomes large even though the intervals of the steps are long. On the other hand, if the user wishes to walk rapidly with large steps, the user may feel uncomfortable if the step becomes small even though the intervals of the steps are short. In such cases, although the rhythm for inducing the user's motion may be to match the motion rhythm with its target rhythm, the force for inducing the user's motion as well as its working distance would cause the motion scale to deviate from its target scale, thereby making the user feel uncomfortable.

In view of the foregoing, it is an object of the present invention to provide a device capable of inducing a user's motion in such a way as to cause the user's motion rhythm and scale to coincide with its target rhythm and scale, a system capable of controlling the device, and a program which provides a computer attached to the motion induction device with functions for controlling the device.

Means for Solving the Problem

To achieve the above object, according to the present invention, there is provided a motion induction device for inducing a user's motion according to an induction oscillator, which device includes: a motion oscillator measurement unit which measures a user's motion oscillator; a first oscillator generation unit which generates a first oscillator that attains mutual entrainment with the motion oscillator measured by the motion oscillator measurement unit in such a way as to reflect a natural angular velocity; a natural angular velocity setting unit which newly sets the natural angular velocity on the basis of a phase difference between the motion oscillator measured by the motion oscillator measurement unit and the first oscillator generated by the first oscillator generation unit; a second oscillator generation unit which generates a second oscillator oscillating in a rhythm reflecting the natural angular velocity set by the natural angular velocity setting unit; and an induction oscillator generation unit which generates an induction oscillator including a first induction oscillator, the first induction oscillator including the second oscillator generated by the second oscillator generation unit and a first potential which brings the motion oscillator responsive to a user's motion scale measured by the motion oscillator measurement unit close to a target value responsive to a target motion scale of the user in accordance with the natural angular velocity set by the natural angular velocity setting unit.

According to the motion induction device of the present invention, the user's motion can be induced in such a way as to match the user's motion rhythm with its target rhythm, primarily for the following reasons.

A "first oscillator" oscillates in an autonomous rhythm reflecting a natural angular velocity, while harmonizing with the rhythm of the user's motion oscillator, by virtue of the effect of "mutual entrainment". It is noted that the concept of the term "oscillate" includes a behavior where a real or virtual object shakes at substantially regular intervals and besides changes with respect to time in a broader sense. The concept of the term "oscillator" includes an electrical signal whose value changes with respect to time, a function defined as one whose value changes with respect to time in software, and the like. Meanwhile, the first oscillator may have an inappropriate phase difference with respect to the user's motion oscillator, from the viewpoint of matching the user's motion rhythm with a target rhythm while harmonizing the user's motion rhythm with a guide rhythm of the motion induction device. Therefore, if the induction oscillator is generated directly from the first oscillator, the user's motion rhythm induced by the induction oscillator might deviate from the target rhythm.

Therefore, a "new natural angular velocity" is set according to the phase difference between the user's motion oscillator and the first oscillator. In this manner, the new natural angular velocity can be made equivalent to an angular velocity of an appropriate oscillator from the viewpoint of inducing the user's motion in such a way as to match the user's motion rhythm with the target rhythm, while harmonizing with the user's motion rhythm specified by the motion oscillator in accordance with a target phase difference. Thereafter, a new first oscillator is repeatedly generated in such a way as to reflect a new natural angular velocity, whereby the deviation of the phase difference between the motion oscillator and the first oscillator from the target phase difference can be gradually reduced while harmonizing the rhythm of the first oscillator with the rhythm of the motion oscillator. Accordingly, even if the user's motion rhythm changes suddenly, appropriate followability of the induction oscillator to such a change can be ensured for the purposes of preventing the user from feeling uncomfortable, and therefore, it is possible to cause the user's motion rhythm to gradually coincide with the target rhythm at a moderate pace.

Subsequently, a "second oscillator" is generated in such a way as to reflect the new natural angular velocity, and further, a "induction oscillator" including the second oscillator is generated. This makes it possible to harmonize the user's motion rhythm induced by the induction oscillator with the rhythm of the induction oscillator, and thus, to match the user's motion rhythm with the target rhythm. With harmonization of the user's motion rhythm with the rhythm of the induction oscillator, the guide rhythm by the motion induction device becomes harmonized with the user's motion rhythm, and the user's motion rhythm also becomes harmonized with the guide rhythm by the motion induction device, and accordingly, harmonization (mutual adaptation) is established between the user (human) and the device (machine).

According to the motion induction device of the present invention, the user's motion can be induced in such a way as to match the user's motion scale with its target scale, primarily for the following reasons.

The "first induction oscillator" includes a first potential for bringing the motion oscillator responsive to the user's motion scale close to its target value. The first potential is in accordance with the new natural angular velocity which is equivalent to an angular velocity of an appropriate oscillator from the viewpoint of inducing the user's motion so as to match the user's motion rhythm with the target rhythm while harmonizing with the user's motion rhythm. Thus, by generating the induction oscillator including the first induction oscillator, it is possible to guide the user's motion in such a way as to harmonize the user's motion rhythm with the rhythm of the induction oscillator, to match the user's motion rhythm with the target rhythm, and to cause the value of the motion oscillator responsive to the user's motion scale to approach the target value, or in other words, to bring the user's motion scale close to the target scale.

As described above, according to the motion induction device of the present invention, it is possible to guide the user's motion in such a way as to cause the user's motion rhythm and scale to coincide respectively with the target rhythm and scale.

It is noted that the user's motion may include various motions such as walking, running, manual work associated with manufacturing, and others. For example, in the case where the manual work related to manufacture of products such as automobiles or the like is induced, the user can follow the induction oscillator to perform the work with a target motion rhythm as well as a target size of movement (or level of force). When the target motion rhythm and scale are set based on the manual work by a skilled person or the like, it is possible to give the user the feelings of the subtle movements and level of force of the hands of the skilled person, and thus to accelerate the learning of the techniques.

Furthermore, the motion induction device according to the present invention is characterized in that the induction oscillator generation unit generates an induction oscillator which includes a second induction oscillator having a second potential that prevents an increase in absolute value of the motion oscillator according to the second oscillator generated by the second oscillator generation unit, the natural angular velocity set by the natural angular velocity setting unit, and a time derivative of the motion oscillator responsive to the user's motion scale measured by the motion oscillator measurement unit.

According to the motion induction device of the present invention, the "second induction oscillator" includes the second potential for preventing an increase in absolute value of the motion oscillator responsive to the user's motion scale. The second potential is in accordance with a new natural angular velocity equivalent to the angular velocity of an appropriate oscillator from the viewpoint of inducing the user's motion in such a way as to match the user's motion rhythm with the target rhythm while harmonizing with the user's motion rhythm. Therefore, by generating the induction oscillator including the second induction oscillator, it is possible to guide the user's motion in such a way as to bring the user's motion scale close to the target scale, while harmonizing the user's motion rhythm with the rhythm of the induction oscillator, while matching the user's motion rhythm with the target rhythm, and while preventing the increase in absolute value of the motion oscillator according to the time derivative of the motion oscillator responsive to the user's motion scale.

Furthermore, the motion induction device according to the present invention is characterized in that the induction oscillator generation unit generates a first induction oscillator which includes a product of a first coefficient corresponding to the first potential as a function of the natural angular velocity set by the natural angular velocity setting unit, a function of a deviation of a value of the motion oscillator responsive to the user's motion scale from the target value, and the second oscillator.

According to the motion induction device of the present invention, the first induction oscillator is represented as an elastic force of an elastic element such as a virtual spring or the like which has the first coefficient responsive to the first potential as an elastic coefficient (spring coefficient) and which restores the value of the motion oscillator responsive to the user's motion scale to the target value. As such, the user's motion can be induced with the rhythm and scale reflecting the elastic element of the user's body, such as the elastic force generated during the transition from the muscle contraction state to the muscle stretch state.

Furthermore, it is characterized in that the induction oscillator generation unit generates a second induction oscillator which includes a product of a second coefficient corresponding to the second potential as a function of the natural angular velocity set by the natural angular velocity setting unit, a function of the time derivative of the motion oscillator responsive to the user's motion scale, and the second oscillator.

According to the motion induction device of the present invention, the second induction oscillator is represented as a damping force of a damping element such as a virtual damper or the like which has the second coefficient responsive to the second potential as a damping coefficient (damper coefficient) and which prevents an increase in absolute value of the motion oscillator according to the time derivative of the motion oscillator responsive to the user's motion scale. As such, the user's motion can be induced with the rhythm and scale reflecting the damping element of the user's body, such as the viscous force generated during the transition from the muscle stretch state to the muscle flexed state.

Furthermore, the motion induction device according to the present invention is characterized in that it further includes a state measurement unit which measures one or both of the user's motion state and physiological state, and a target motion setting unit which sets one or both of the user's target motion rhythm and target scale according to one or both of the user's motion state and physiological state determined by the state measurement unit.

According to the motion induction device of the present invention, the user's motion can be induced with appropriate rhythm and scale from the viewpoint of matching the user's motion rhythm with the target rhythm corresponding to one or both of the user's "motion state" and "physiological state". Furthermore, the user's motion can be induced with appropriate rhythm and scale from the viewpoint of matching the user's motion scale with the target scale corresponding to one or both of the user's "motion state" and "physiological state". The user's motion state may include, in the case where the user is walking, a state where the user walks on the substantially level ground, a state where the user ascends a slope or stairs, a state where the user descends a slope or stairs, a state where the user walks slowly, and a state where the user walks quickly. Additionally, the user's physiological state may include a state where the user's degree of fatigue is high, a state where the user's degree of fatigue is low, a state where the user's heart rate or perspiration amount is high, a state where the user's heart rate is low, and the like.

Alternatively, the motion induction device according to the present invention may further include a state measurement unit which measures one or both of the user's motion state and physiological state, and a target phase difference setting unit which sets a target phase difference according to one or both of the user's motion state and physiological state determined by the state measurement unit.

According to the motion induction device of the present invention, the user's motion can be induced in such a way that the phase difference between the user's motion oscillator and the induction oscillator by the motion induction device approaches a target phase difference according to one or both of the user's "motion state" and "physiological state". Accordingly, it is possible to guide the user's motion in an appropriate rhythm from the viewpoint of bringing the user's motion rhythm close to the target rhythm according to a change of the user's motion state and/or physiological state.

Furthermore, the motion induction device according to the present invention is characterized in that the first oscillator generation unit generates the first oscillator as an output of a first element, in accordance with a first model which represents a relationship between a plurality of virtual first elements having outputs varying according to motion oscillators.

According to the motion induction device of the present invention, it is possible to cause the relationship between a plurality of actual elements concerning the user's actual motion to be reflected to the relationship between a plurality of virtual first elements in the first model, whereby an appropriate first oscillator can be generated in view of the relationship between the plurality of actual elements. For example, in the case where the left and right legs or a plurality of joints of the same leg are assumed as the plurality of actual elements, the first oscillator is generated in such a way as to reflect the qualitative relationship between the left and right legs such as their moving back and forth alternately or the like, or the qualitative relationship between the joints of the same leg such as the period or phase difference between the leg motion around the hip joint and the leg motion around the knee joint. Therefore, the rhythm and scale of the induction oscillator inducing the user's motion can be made appropriate in view of the relationship concerned.

Alternatively, the motion induction device according to the present invention may further include a state measurement unit which measures one or both of the user's motion state and physiological state, and a first correlation adjustment unit which adjusts a correlation between the plurality of virtual first elements in the first model according to one or both of the user's motion state and physiological state determined by the state measurement unit.

According to the motion induction device of the present invention, the user's motion can be induced in real time with appropriate rhythm and scale according to the user's state, in such a way as to reflect the condition that the relationship between a plurality of actual elements such as the left and right legs varies in accordance with the user's "motion state" and/or "physiological state".

Furthermore, the motion induction device according to the present invention is characterized in that the second oscillator generation unit generates the second oscillator as an output of a second element, in accordance with a second model which represents a relationship between a plurality of virtual second elements having outputs varying according to motion oscillators.

According to the motion induction device of the present invention, it is possible to cause the relationship between a plurality of actual elements concerning the user's actual motion to be reflected to the relationship between a plurality of virtual second elements in the second model, whereby an appropriate second oscillator can be generated in view of the relationship between the plurality of actual elements. For example, in the case where a plurality of user's neurons are assumed as the actual plural elements, the second oscillator is generated in such a way as to reflect the qualitative relationship between the neurons that govern walking by the left and right legs. Therefore, the rhythm and scale of the induction oscillator inducing the user's motion can be made appropriate in view of the relationship concerned.

Furthermore, the motion induction device according to the present invention may further include a state measurement unit which measures one or both of the user's motion state and physiological state, and a second correlation adjustment unit which adjusts a correlation between a plurality of virtual second elements in the second model according to one or both of the user's motion state and physiological state determined by the state measurement unit.

According to the motion induction device of the present invention, the user's motion can be induced in real time with appropriate rhythm and scale according to the user's state, in such a way as to reflect the condition that the relationship between a plurality of actual elements such as the neural elements (neurons) varies in accordance with the user's "motion state" and/or "physiological state".

Furthermore, the motion induction device according to the present invention is characterized in that the natural angular velocity setting unit sets a relationship between two virtual oscillators in a virtual model on the basis of a first phase difference corresponding to a phase difference between the motion oscillator measured by the motion oscillator measurement unit and the first oscillator generated by the first oscillator generation unit, and then sets an angular velocity of one of the two oscillators as a new natural angular velocity in such a way as to bring a second phase difference corresponding to a phase difference between the two oscillators close to a target phase difference.

According to the motion induction device of the present invention, the relationship between the two virtual oscillators in the virtual model is set to correspond to the phase difference (first phase difference) between the user's motion oscillator and first oscillator. Further, one of the angular velocities of the two oscillators is set as a new natural angular velocity so as to bring the phase difference (second phase difference) between the two oscillators close to a target phase difference. Accordingly, the new natural angular velocity becomes equivalent to an angular velocity of an appropriate oscillator from the viewpoint of inducing the user's motion in such a way as to match the user's motion rhythm with the target rhythm, while harmonizing with the user's motion rhythm specified by the motion oscillator according to the target phase difference.

Furthermore, the motion induction device according to the present invention is characterized in that the natural angular velocity setting unit includes: a correlation coefficient setting unit which sets a correlation coefficient representing a relationship between the two virtual oscillators in the virtual model on the basis of the first phase difference; a first angular velocity setting unit which sets an angular velocity of a virtual motion oscillator, on the basis of the correlation coefficient set by the correlation coefficient setting unit, in such a way as to minimize a difference between the first phase difference and the second phase difference; and a second angular velocity setting unit which sets an angular velocity of a virtual induction oscillator as the new natural angular velocity, on the basis of the angular velocity set by the first angular velocity setting unit, in such a way as to minimize a difference between the second phase difference and the target phase difference.

According to the motion induction device of the present invention, through setting of the correlation coefficient for the two virtual oscillators in the virtual model and the like, it is possible to set, as the new natural angular velocity, the angular velocity of an appropriate oscillator from the viewpoint of inducing the user's motion in such a way as to match the user's motion rhythm with the target rhythm according to the target phase difference, while harmonizing with the user's motion rhythm specified by the motion oscillator as described above. Accordingly, it is possible to set an induction oscillator having appropriate rhythm and scale from the viewpoint of matching the user's motion rhythm with the target rhythm corresponding to the target phase difference, while harmonizing with the user's motion rhythm specified by the motion oscillator.

To achieve the above object, according to the present invention, there is provided a control system which controls a device for inducing a user's motion according to an induction oscillator, and which includes: a motion oscillator measurement unit which measures a user's motion oscillator; a first oscillator generation unit which generates a first oscillator that attains mutual entrainment with the motion oscillator measured by the motion oscillator measurement unit in such a way as to reflect a natural angular velocity; a natural angular velocity setting unit which newly sets the natural angular velocity on the basis of a phase difference between the motion oscillator measured by the motion oscillator measurement unit and the first oscillator generated by the first oscillator generation unit; a second oscillator generation unit which generates a second oscillator oscillating in a rhythm reflecting the natural angular velocity set by the natural angular velocity setting unit; and an induction oscillator generation unit which generates an induction oscillator including a first induction oscillator, the first induction oscillator including the second oscillator generated by the second oscillator generation unit and a first potential which brings the motion oscillator responsive to a user's motion scale measured by the motion oscillator measurement unit close to a target value responsive to a target motion scale of the user in accordance with the natural angular velocity set by the natural angular velocity setting unit.

According to the control system of the present invention, it is possible to control the motion induction device so that the user's motion can be induced in such a way as to cause the user's motion rhythm and scale to coincide respectively with the target rhythm and scale.

Furthermore, the control system according to the present invention is characterized in that the induction oscillator generation unit generates an induction oscillator which includes a second induction oscillator having a second potential that prevents an increase in absolute value of the motion oscillator according to the second oscillator generated by the second oscillator generation unit, the natural angular velocity set by the natural angular velocity setting unit, and a time derivative of the motion oscillator responsive to the user's motion scale measured by the motion oscillator measurement unit.

To achieve the above object, according to the present invention, there is provided a control program which provides a computer attached to a device for inducing a user's motion according to an induction oscillator with functions for controlling the device, wherein the functions include: a motion oscillator measurement function of measuring a user's motion oscillator; a first oscillator generation function of generating a first oscillator which attains mutual entrainment with the motion oscillator measured by the motion oscillator measurement function in such a way as to reflect a natural angular velocity; a natural angular velocity setting function of newly setting the natural angular velocity on the basis of a phase difference between the motion oscillator measured by the motion oscillator measurement function and the first oscillator generated by the first oscillator generation function; a second oscillator generation function of generating a second oscillator oscillating in a rhythm reflecting the natural angular velocity set by the natural angular velocity setting function; and an induction oscillator generation function which generates an induction oscillator including a first induction oscillator, the first induction oscillator including the second oscillator generated by the second oscillator generation function and a first potential which brings the motion oscillator responsive to a user's motion scale measured by the motion oscillator measurement function close to a target value responsive to a target motion scale of the user in accordance with the natural angular velocity set by the natural angular velocity setting function.

According to the control program of the present invention, the computer attached to the motion induction device is provided with the functions for controlling the motion induction device so that the user's motion can be induced in such a way as to cause the user's motion rhythm and scale to coincide respectively with the target rhythm and scale.

Furthermore, the control program according to the present invention is characterized in that it provides the computer attached to the motion induction device with a function, as the induction oscillator generation function, of generating an induction oscillator which includes a second induction oscillator having a second potential that prevents an increase in absolute value of the motion oscillator according to the second oscillator generated by the second oscillator generation function, the natural angular velocity set by the natural angular velocity setting function, and a time derivative of the motion oscillator responsive to the user's motion scale measured by the motion oscillator measurement function.

BRIEF DESCRIPTION OF THE DRAWINGS

FIG. 9 is yet another explanatory diagram showing an experimental result of the operation and effect of the motion induction device according to the present invention.

BEST MODE FOR CARRYING OUT THE INVENTION

Embodiments of a motion induction device and its control system and control program according to the present invention will now be described with reference to the drawings.

Basically, subscripts L and R will be attached to parameters to make a distinction between left and right for walker's legs or the like, though the subscripts L and R may be omitted in some cases for simplicity of notation.

Figure 1:
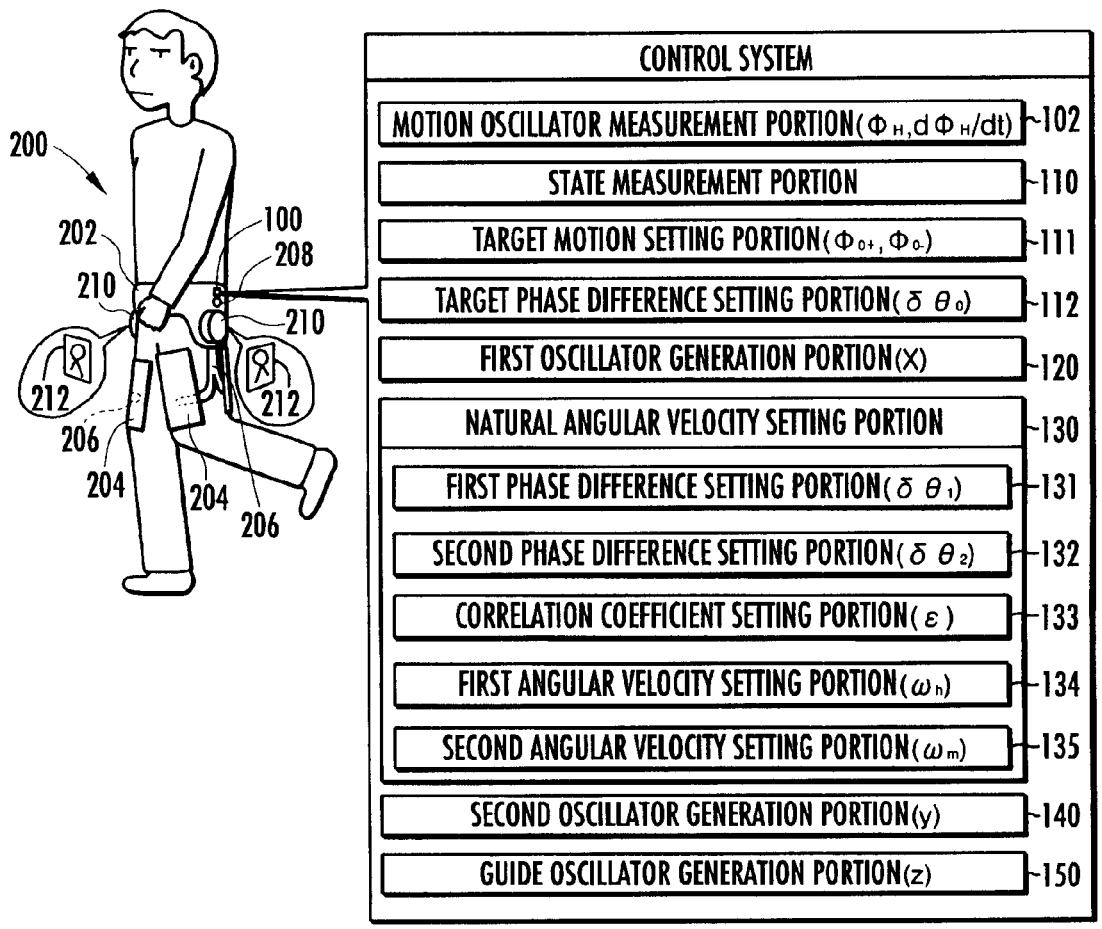
FIG. 1 is an illustrative configuration diagram of a motion induction device and its control system according to the present invention.

A walking assist device (motion induction device) 200 shown in FIG. 1 includes a waist orthosis 202, a thigh orthosis 204, a force transmitting member 206, a battery 208, an actuator (electric motor) 210, and a hip joint angle sensor 212.

The waist orthosis 202 is made of rigid and flexible materials combined with each other and it is attached to a user's waist. The thigh orthosis 204 is also made of combined rigid and flexible materials and it is attached to each of the front and back of a user's thigh. The force transmitting member 206, which is made of lightweight rigid plastic or any other material having shape retention, extends downward from each side of the user's waist along the user's corresponding thigh and then bifurcates toward the front and back of the thigh. It is connected to the actuator 210 and the respective thigh orthoses 204. The battery 208 is housed in the waist orthosis 202 (for example, fixed between a plurality of materials constituting the waist orthosis 202) and supplies electric power to the actuator 210 and the like. The actuator 210 is housed in the waist orthosis 202 and applies a force to the user's thigh via the force transmitting member 206 and the thigh orthoses 204. The hip joint angle sensor 212 is composed of a rotary encoder and the like provided on each side of the user's waist, and outputs a signal responsive to a hip joint angle.

The control system 100 shown in FIG. 1 is composed of a computer as hardware housed in the waist orthosis 202, and a "control program" of the present invention as software which provides the computer with functions for controlling the walking device 200.

The control system 100 includes a motion oscillator measurement portion 102, a state measurement portion 110, a target motion setting portion 111, a target phase difference setting portion 112, a first oscillator generation portion 120, a natural angular velocity setting portion 130, a second oscillator generation portion 140, and an induction oscillator generation portion 150. Each portion is composed of a CPU, ROM, RAM, I/O and the like as hardware, and the "control program" of the present invention as software which provides various functions to the CPU and the like (the same applies hereinafter). It is noted that the CPU and the like of each portion may be separate from those of the other portions, or may be shared among the portions.

The motion oscillator measurement portion 102 measures a hip joint angle $\phi_H$ as a motion oscillator responsive to a user's motion scale, on the basis of an output of the hip joint angle sensor 212. Further, the motion oscillator measurement portion 102 measures a hip joint angular velocity $d\phi_H/dt$ as a time derivative of the motion oscillator responsive to the user's motion scale, on the basis of an output of the hip joint angle sensor 212.

The state measurement portion 110 reads correspondence between a user's walking state and a track pattern formed on an n-dimensional space by n motion oscillators from a memory. The state measurement portion 110 then determines the user's "walking state" on the basis of the correspondence and the track pattern formed on the n-dimensional space by the n motion oscillators including the hip joint angular velocity $d\phi_H/dt$ measured by the motion oscillator measurement portion 102.

The target motion setting portion 111 sets target rhythm and scale for the user's motion, specifically e.g. coefficients related to the target rhythm and scale, in accordance with the "walking state" determined by the state measurement portion 110.

The target phase difference setting portion 112 sets a target phase difference $\delta\theta_0$ between the user's motion oscillator and an induction oscillator (torque) T by the walking assist device 200, in accordance with the "walking state" determined by the state measurement portion 110.

The first oscillator generation portion 120 generates a first oscillator x according to a "first model", on the basis of the hip joint angular velocity $d\phi_H/dt$ measured by the motion oscillator measurement portion 102 and a natural angular velocity $\omega_M$.

The natural angular velocity setting portion 130 includes a first phase difference setting portion 131, a second phase difference setting portion 132, a correlation coefficient setting portion 133, a first angular velocity setting portion 134, and a second angular velocity setting portion 135.

The first phase difference setting portion 131 sets a phase difference between an angular velocity $\omega_H$ of the hip joint angular velocity $d\phi_H/dt$ and the oscillator x reflecting the natural angular velocity $\omega_M$ included in a van der Pol equation, as a first phase difference $\delta\theta_1$.

The second phase difference setting portion 132 sets a phase difference between a virtual motion oscillator $\theta_h$ and a virtual induction oscillator $\theta_m$ as a second phase difference $\delta\theta_2 (=\theta_h - \theta_m)$, according to a "virtual model" representing the relationship between the virtual motion oscillator $\theta_h$ and the virtual induction oscillator $\theta_m$.

The correlation coefficient setting portion 133 sets a correlation coefficient $\epsilon$ between the virtual motion oscillator $\theta_h$ and the virtual induction oscillator $\theta_m$ in such a way that the second phase difference $\delta\theta_2$ set by the second phase difference setting portion 132 approaches the first phase difference $\delta\theta_1$ set by the first phase difference setting portion 131.

The first angular velocity setting portion 134 sets an angular velocity $\omega_h$ of the virtual motion oscillator $\theta_h$ on the basis of the correlation coefficient $\epsilon$ set by the correlation coefficient setting portion 133.

The second angular velocity setting portion 135 sets an angular velocity $\omega_m$ of the virtual induction oscillator $\theta_m$ as a new natural angular velocity $\omega_M$, on the basis of the angular velocity $\omega_h$ of the virtual motion oscillator $\theta_h$ set by the first angular velocity setting portion 134, in such a way that the second phase difference $\delta\theta_2$ set by the second phase difference setting portion 132 approaches the target phase difference $\delta\theta_0$ set by the target phase difference setting portion 112.

The second oscillator generation portion 140 generates a second oscillator y according to a "second model", on the basis of the hip joint angle $\phi_H$ measured by the motion oscillator measurement portion 102 and the new natural angular velocity $\omega_M$ set by the natural angular velocity setting portion 130.

The induction oscillator generation portion 150 generates an induction oscillator z by the walking assist device 200, on the basis of the natural angular velocity $\omega_M$ set by the natural angular velocity setting portion 130 and the second oscillator y generated by the second oscillator generation portion 140.

The functions of the walking assist device and its control system 100 having the above configurations will now be described with reference to FIGS. 2-4.

Figure 2:
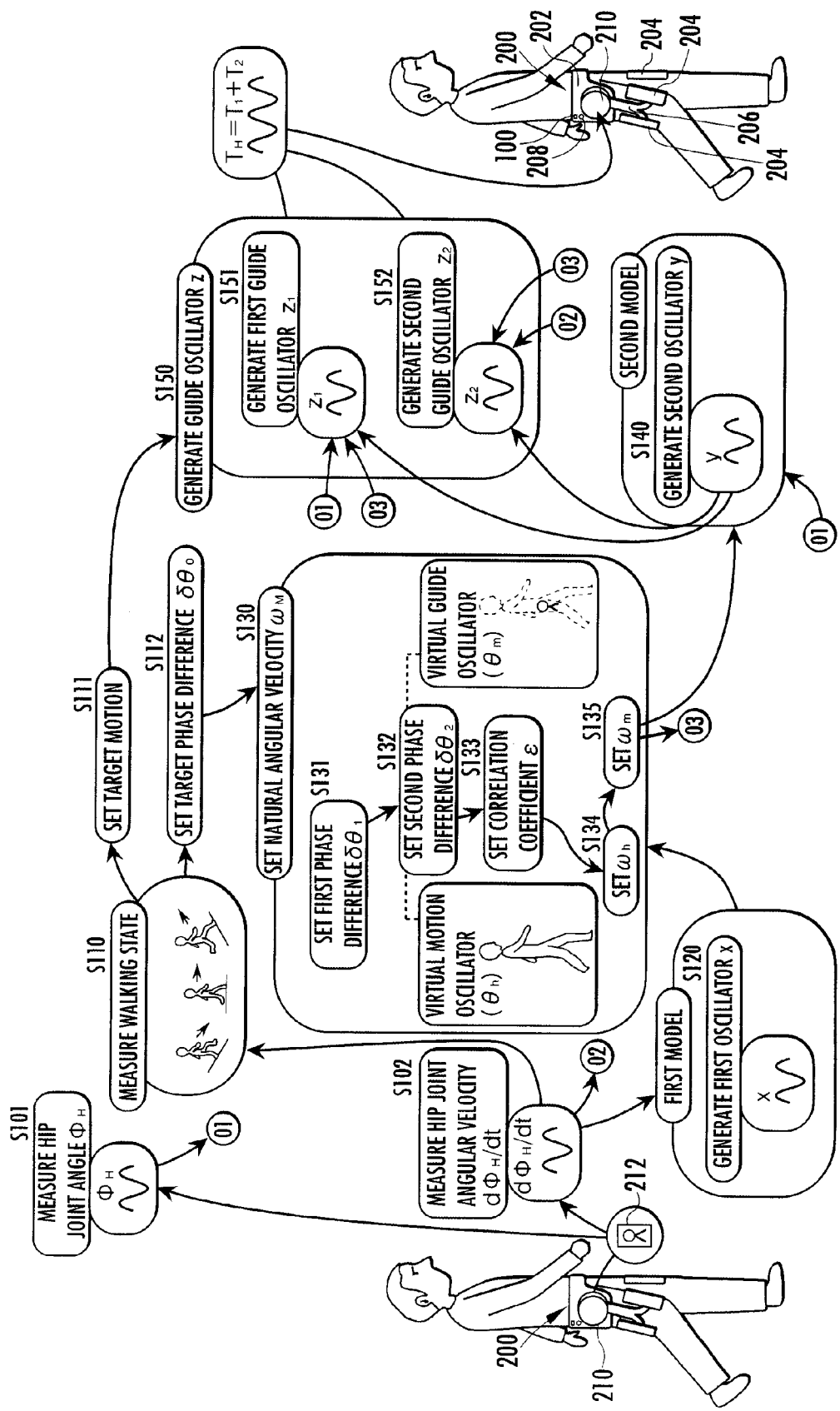
FIG. 2 is an illustrative functional diagram of the motion induction device and its control system according to the present invention.
Figure 3:
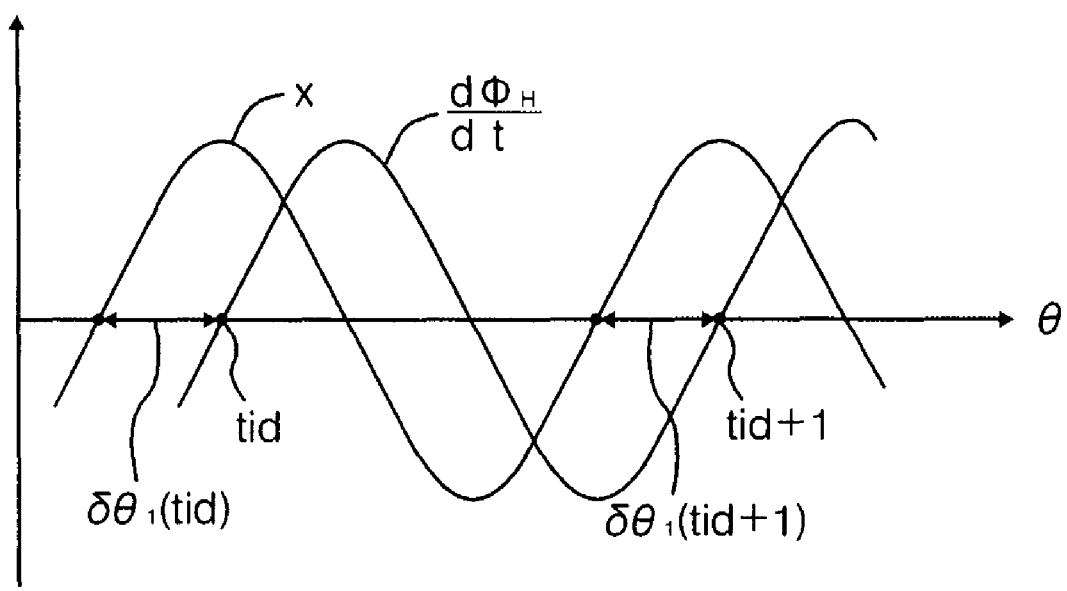
FIG. 3 is an illustrative diagram of a relationship between a motion oscillator and a first oscillator.

The motion oscillator measurement portion 102 measures user's left and right hip joint angles (motion oscillators responsive to the user's motion scale) $\phi_H=(\phi_{HL}, \phi_{HR})$ on the basis of outputs from the hip joint angle sensors 212 (s101 in FIG. 2). Further, the motion oscillator measurement portion 102 measures user's left and right hip joint angular velocities (time derivatives of the motion oscillators responsive to the user's motion scale) $d\phi_H/dt=(d\phi_{HL}/dt, d\phi_{HR}/dt)$ on the basis of outputs from the hip joint angle sensors 212 (s102 in FIG. 2).

Further, the state measurement portion 110 determines the user's walking state on the basis of n motion oscillators (n=1, 2, . . . ) including the hip joint angular velocity ($d\phi_H/dt$) measured by the motion oscillator measurement portion 102 (s110 in FIG. 2). Specifically, the state measurement portion 110 reads the correspondence between a user's walking state and a track pattern formed on an n-dimensional space by n motion oscillators from a memory (not shown). The state measurement portion 110 then determines the user's "walking state" on the basis of the correspondence and the pattern formed on the n-dimensional space by the n motion oscillators. The user's walking state may include a "level walking state" where the user walks on a substantially level ground, an "upward walking state" where the user ascends a slope or stairs, a "downward walking state" where the user descends a slope or stairs, a "slow walking state" where the user walks slowly, and a "quick walking state" where the user walks quickly.

As the motion oscillator for use in measurement of the walking state, any kind of parameter varying with a rhythm linked to the walking motion rhythm may be measured, which may be the user's hip joint angle $\phi_H$, the angle, angular velocity, or angular acceleration of the knee joint, ankle joint, shoulder joint, or elbow joint, the position of a portion of a leg, or the walker's landing sound, respiratory sound, intentional voice sound, or the like.

The target motion setting portion 111 sets the rhythm and scale of the user's target motion, specifically coefficients related to the target rhythm and scale which will be described later, in accordance with the "walking state" determined by the state measurement portion 110 (sill in FIG. 2).

Further, the target phase difference setting portion 112 sets a target phase difference $\delta\theta_0=(\delta\theta_{0L}, \delta\theta_{0R})$ on the basis of the "walking state" determined by the state measurement portion 110 (s112 in FIG. 2). For example, the target phase difference $\delta\theta_0$ is set to "0" in response to the determination result that the user is in the "level walking state". The target phase difference $\delta\theta_0$ is set to a negative value (e.g., not greater than 0.5[rad]) in response to the determination result that the user is in the "upward walking state". The target phase difference $\delta\theta_0$ is set to a positive value (e.g., not less than +0.3[rad]) in response to the determination result that the user is in the "downward walking state". The target phase difference $\delta\theta_0$ is set to a negative value (e.g., not greater than 0.2[rad]) in response to the determination result that the user is in the "quick walking state". The target phase difference $\delta\theta_0$ is set to a positive value (e.g., not less than +0.5[rad]) in response to the determination result that the user is in the "slow walking state". It is noted that the left and right components $\delta\theta_{0L}$ and $\delta\theta_{0R}$ of the target phase difference $\delta\theta_0$ may be equal to or different from each other.

Furthermore, the first oscillator generation portion 120 sets a first oscillator $x=(x_L, x_R)$ according to the "first model", on the basis of the hip joint angular velocity $d\phi_H/dt$ measured by the motion oscillator measurement portion 102 and a natural angular velocity $\omega_M=(\omega_{ML}, \omega_{MR})$ (s120 in FIG. 2). The first model represents a relationship between a plurality of virtual first elements, such as virtual left and right legs whose outputs vary according to the motion oscillator such as the hip joint angular velocity $d\phi_H/dt$ and the like, by the van der Pol equations in the following expression (1).

$$d^2 x_L / dt^2 = \xi(1 - x_L^2)(dx_L/dt) - \omega_{ML}^2 x_L + g(x_L - x_R) + K(d\phi_{HL}/dt), \quad (1)$$

$$(d^2 x_R / dt^2) = \xi(1 - x_R^2)(dx_R/dt) - \omega_{MR}^2 x_R + g(x_R - x_L) + K(d\phi_{HR}/dt),$$

where "$\xi$" is a coefficient (>0) set so that the first oscillator x and its one time derivative (dx/dt) move along a stable limit cycle over the x-(dx/dt) plane. "g" is a first correlation coefficient representing a correlation between the virtual left and right legs (first elements) in the first model. "K" is a feedback coefficient. The natural angular velocity $\omega_M$ may be set arbitrarily within a range not widely deviating from an actual walking assist rhythm (walking guide rhythm) made by the walking assist device 200.

The first oscillator $x=(x_L, x_R)$ is set by the Runge-Kutta method. Components $x_L$ and $x_R$ of the first oscillator x represent virtual walking assist rhythms related to the left and right legs, respectively. In addition, by virtue of the "mutual entrainment" which is one of the properties of the van der Pol equation, the first oscillator x has a property of oscillating according to a change with respect to time in an autonomous rhythm reflecting the "natural angular velocity" $\omega_M$, while harmonizing with the rhythm of the hip joint angular velocity $d\phi_H/dt$ that changes with respect to time in a rhythm (angular velocity) approximately the same as an actual walking motion rhythm.

Alternatively, the first oscillator x may be generated on the basis of the hip joint angle $\phi_H$, the angle or angular velocity of the knee joint, ankle joint, shoulder joint, or elbow joint, or any of various oscillators changing at rhythms reflecting the user's walking motion rhythm (motion rhythm) such as a walker's landing sound, respiratory sound, or intermittent voice sound, instead of or in addition to the hip joint angular velocity $d\phi_H/dt$.

Moreover, the first model may be represented by a van del Pol equation different in form from the van del Pol equations in the expression (1), or may be represented by any kind of equations by which the oscillator can be generated with the mutual entrainment effect with the motion oscillator such as the hip joint angular velocity $d\phi_H/dt$ or the like.

Subsequently, the natural angular velocity setting portion 130 newly sets the natural angular velocity $\omega_M$ according to the virtual model including two virtual oscillators, on the basis of the target phase difference $\delta\theta_0$ set by the target phase difference setting portion 112 and the first oscillator x generated by the first oscillator generation portion 120 (s130 in FIG. 2).

Specifically, firstly, for each of the left and right components, the first phase difference setting portion 131 sets, as the first phase difference $\delta\theta_1$, a phase difference $\theta_H-\theta_M$ between the phase $\theta_H$ of the hip joint angular velocity $d\phi_H/dt$ measured by the motion oscillator measurement portion 102 and the phase $\theta_M$ of the first oscillator x generated by the first oscillator generation portion 120 (s131 in FIG. 2). For example, as shown in FIG. 3, the phase difference (first phase difference) $\delta\theta_1(=\theta_H-\theta_M)$ between the phase $\theta_H$ of the hip joint angular velocity ($d\phi_H/dt$) and the phase $\theta_M$ of the first oscillator x is set in accordance with a time difference between a time point ( . . . , $t_{id}$, $t_{id+1}$, . . . ) where ($d\phi_H/dt$)=0 and ($d^2\phi_H/dt^2$)>0 and a time point where x=0 and (dx/dt)>0.

Next, with a requirement that the first phase difference $\delta\theta_1$ set by the first phase difference setting portion 131 was kept constant throughout the past three walking periods, the second phase difference setting portion 132 sets, as a second phase difference $\delta\theta_2$, a phase difference $\theta_h$-$\theta_m$ between the virtual motion oscillator oh and the virtual induction oscillator $\theta_m$ expressed by the following expression (2.3), according to a "virtual model" expressed by the following expressions (2.1) and (2.2), for each of the left and right components (s132 in FIG. 2).

$$d\theta_h/dt = \omega_h + \epsilon \cdot \sin(\theta_{mL} - \theta_{hL}) \tag{2.1}$$

$$d\theta_m/dt = \omega_m + \epsilon \cdot \sin(\theta_{hL} - \theta_{mL}) \tag{2.2}$$

$$\delta\theta_2 = \arcsin[(\omega_h - \omega_m)/2\epsilon] \tag{2.3}$$

where $\epsilon = (\epsilon_L, \epsilon_R)$ is a correlation coefficient for each of the left and right components of the virtual motion oscillator $\theta_h = (\theta_{hL}, \theta_{hR})$ and the motion induction oscillator $\theta_m = (\theta_{mL}, \theta_{mR})$ in the virtual model. In addition, $\omega_h$ is an angular velocity of the virtual motion oscillator $\theta_h$, and $\omega_m$ is an angular velocity of the virtual induction oscillator $\theta_m$.

Subsequently, the correlation coefficient setting portion 133 sets the correlation coefficient $\epsilon$ in such a way that a difference $\delta\theta_1 - \delta\theta_2$ between the first phase difference $\delta\theta_1$ set by the first phase difference setting portion 131 and the second phase difference $\delta\theta_2$ set by the second phase difference setting portion 132 is minimum (s133 in FIG. 2).

Specifically, for each of the left and right components, the correlation coefficient $\epsilon$ is sequentially set in discrete times ( . . . , $t_{id-1}$, $t_{id}$, $t_{id+1}$, . . . ) where the hip joint angular velocity (motion oscillator) $d\phi_H/dt$ is 0 (see FIG. 3), according to the following expression (2.4).

$$\varepsilon(t_{id+1}) = \varepsilon(t_{id}) - \eta\{V_1(t_{id+1}) - V_1(t_{id})\}/\{\varepsilon(t_{id}) - \varepsilon(t_{id-1})\}, \tag{2.4}$$

$$V(t_{id+1}) \equiv (1/2)\{\delta\theta_1(t_{id+1}) - \delta\theta_2(t_{id})\}^2$$

where the components in $\eta = (\eta_L, \eta_R)$ are coefficients representing the stability of the potential $V = (V_L, V_R)$ which brings the left and right components of the first phase difference $\delta\theta_1$ close to those of the second phase difference $\delta\theta_2$.

Next, on the basis of the correlation coefficient $\epsilon$ set by the correlation coefficient setting portion 133, on the condition that the natural angular velocity $\omega_m$ of the virtual induction oscillator $\theta_m$ is kept constant, the first angular velocity setting portion 134 sets an angular velocity $\omega_h$ of the virtual motion oscillator $\theta_h$ according to the following expression (2.5), for each of the left and right components, in such a way that the components of the difference $\delta\theta_1 - \delta\theta_2$ between the first and second phase differences are minimum (s134 in FIG. 2).

$$\omega_h(t_{id}) = -\alpha \int dt \cdot \left( \begin{bmatrix} 4\varepsilon(t_{id})^2 - \\ \{\omega_h(t) - \omega_m(t_{id})\}^2 \end{bmatrix}^{1/2} \times \\ \sin\begin{bmatrix} \arcsin\{(\omega_h(t) - \omega_m(t_{id-1}))/2\varepsilon(t_{id})\} \\ -\delta\theta_1(t_{id}) \end{bmatrix} \right) \tag{2.5}$$

where the components of $\alpha = (\alpha_L, \alpha_R)$ are coefficients representing the stability of a system.

Subsequently, for each of the left and right components, the second angular velocity setting portion 135 sets the angular velocity $\omega_m$ of the virtual induction oscillator $\theta_m$ as a new natural angular velocity $\omega_M$, on the basis of the angular velocity $\omega_h$ of the virtual motion oscillator $\theta_h$ set by the first angular velocity setting portion 134 (s135 in FIG. 2). Specifically, the second angular velocity setting portion 135 sets the angular velocity $\omega_m = (\omega_{mL}, \omega_{mR})$ of the virtual induction oscillator $\theta_m$ according to the following expression (2.6), for each of the left and right components, in such a way that the second phase difference $\delta\theta_2$ approaches a target phase difference $\delta\theta_0$.

$$\omega_m(t_{id}) = \beta \int dt \cdot ([4\varepsilon(t_{id})^2 - \{\omega_h(t_{id}) - \omega_m(t)\}^2) \times \tag{2.6}$$
$$\sin[\arcsin\{(\omega_h(t_{id}) - \omega_m(t))/2\varepsilon(t_{id})\} - \delta\theta_0])$$

where the components of $\beta = (\beta_L, \beta_R)$ are coefficients representing the stability of a system.

Subsequently, the second oscillator generation portion 140 generates a second oscillator $y = (y_{L+}, y_{L-}, y_{R+}, y_{R-})$ according to a "second model", on the basis of the hip joint angle $\phi_H$ measured by the motion oscillator measurement portion 102 and the new natural angular velocity $\omega_M$ set by the natural angular velocity setting portion 130 (s140 in FIG. 2). The second model represents a relationship between a plurality of virtual second elements, such as a plurality of virtual neural elements or the like, whose outputs vary according to the motion oscillator such as the hip joint angle $\phi_H$. More specifically, the second model is expressed by the following simultaneous differential equations (3), which include: a state variable $u_i$ (i=L+, L−, R+, R−) corresponding to changes in membrane potential of neural elements L+ and L− which govern the motions of the left thigh in the bending direction (forward) and in the stretching direction (backward), respectively, and neural elements R+ and R− which govern the motions of the right thigh in the bending direction and in the stretching direction, respectively; and a self-control factor $v_i$ reflecting an adaptive effect of the neural element i.

$$\tau_{1L+} \cdot du_{L+}/dt = -u_{L+} + w_{L+/L-}y_{L-} + \tag{3}$$
$$w_{L+/R+}y_{R+} - \lambda_L v_{L+} + f_1(\omega_{ML}) + f_2(\omega_{ML})K(\phi_L),$$
$$\tau_{1L-} \cdot du_{L-}/dt = -u_{L-} + w_{L-/L+}y_{L+} + w_{L-/R-}y_{R-} -$$
$$\lambda_L v_{L-} + f_1(\omega_{ML}) + f_2(\omega_{ML})K(\phi_L),$$
$$\tau_{1R+} \cdot du_{R+}/dt = -u_{R+} +$$
$$w_{R+/L+}y_{L+} + w_{R+/R-}y_{R-} - \lambda_R v_{R+} + f_1(\omega_{MR}) + f_2(\omega_{MR})K\phi_R),$$
$$\tau_{1R-} \cdot du_{R-}/dt = -u_{R-} +$$
$$w_{R-/L-}y_{L-} + w_{R-/R+}y_{R+} - \lambda_R v_{R-} + f_1(\omega_{MR}) + f_2(\omega_{MR})K\phi_R),$$
$$\tau_{2i} \cdot dv_i/dt = -v_i + y_i,$$
$$y_i = H(u_i - u_{th}), H \equiv 0(u_i < u_{th}), 1(u_i \geq u_{th}) \text{ or}$$
$$= fs(u_i) \equiv 1/\{1 + \exp(-u_i/\xi)\}$$

where $\tau_{1i}$ is a time constant which defines a variation character of the state variable $u_i$ and it has a dependence on the new natural angular velocity $\omega_M$ as shown by the following expression (3.1) for each of the left and right components.

$$\tau_{1i} \equiv t(\omega_{ML})/\omega_{ML} - \gamma_L \ (i = L+, L-), \tag{3.1}$$
$$\equiv t(\omega_{MR})/\omega_{MR} - \gamma_R \ (i = R+, R-)$$

where $t(\omega)$ is a coefficient having a dependence on $\omega$. $\gamma = (\gamma_L, \gamma_R)$ is a constant.

In addition, $\tau_{2i}$ is a time constant which defines a variation character of the self-control factor $v_i$. Moreover, $w_{ij}$ (<0) is a second correlation coefficient (constant) representing a relationship between a plurality of virtual second elements (neural elements) i and j. "$\lambda_L$" and "$\lambda_R$" are habituation coefficients. K is a feedback coefficient responsive to the hip joint angle $\phi_H$.

"$f_1$" and "$f_2$" are functions defined by the following expressions (3.2) and (3.3), respectively.

$$f_1(\omega) \equiv c \cdot \omega (c > 0) \qquad (3.2)$$

$$f_2(\omega) \equiv c_0 + c_1 \omega + c_2 \omega^2 \qquad (3.3)$$

The coefficients c, $c_0$, $c_1$, and $c_2$ of $f_1(\omega_M)$ and $f_2(\omega_M)$, functions of the new natural angular velocity $\omega_M$, may be set as coefficients corresponding to the target motion rhythm set by the target motion setting portion 111.

Alternatively, the second oscillator $y_i$ may be generated on the basis of the hip joint angular velocity $d\phi_H/dt$, the angle or angular velocity of the knee joint, ankle joint, shoulder joint, or elbow joint, or any of various oscillators varying with a rhythm linked to the walking motion rhythm such as a walker's landing sound, respiratory sound, or intentional voice sound, instead of or in addition to the hip joint angle $\phi_H$.

The second oscillator $y_i$ is 0 when the value of the state variable $u_i$ is less than a threshold value $u_{th}$. When the value of the state variable $u_i$ is equal to or greater than the threshold value $u_{th}$, the second oscillator $y_i$ takes the value of the state variable $u_i$. Alternatively, the second oscillator $y_i$ is defined by a sigmoid function fs (see the expression (3)). As such, as to the movement of the thigh in the bending direction (frontward), the second oscillators $y_{L+}$ and $y_{R+}$ corresponding to the outputs of the second elements (neural elements) L+ and R+ which govern the relevant movement become greater than the outputs of the other second elements. As to the movement of the thigh in the stretching direction (backward), the second oscillators $y_{L-}$ and $y_{R-}$ corresponding to the outputs of the second elements L− and R− which govern the relevant movement become greater than the outputs of the other second elements. The forward or backward movement of the leg (thigh) is identified, e.g., by a polarity of the hip joint angular velocity $d\phi_H/dt$.

Next, the induction oscillator generation portion 150 sets an induction oscillator z on the basis of the hip joint angle $\phi_H$ measured by the motion oscillator measurement portion 102, the hip joint angular velocity $d\phi_H/dt$ measured by the motion oscillator measurement portion 102, the second oscillator $y_i$ generated by the second oscillator generation portion 140, and the new natural angular velocity $\omega_M$ set by the natural angular velocity setting portion 130 (s150 in FIG. 2).

Figure 4:
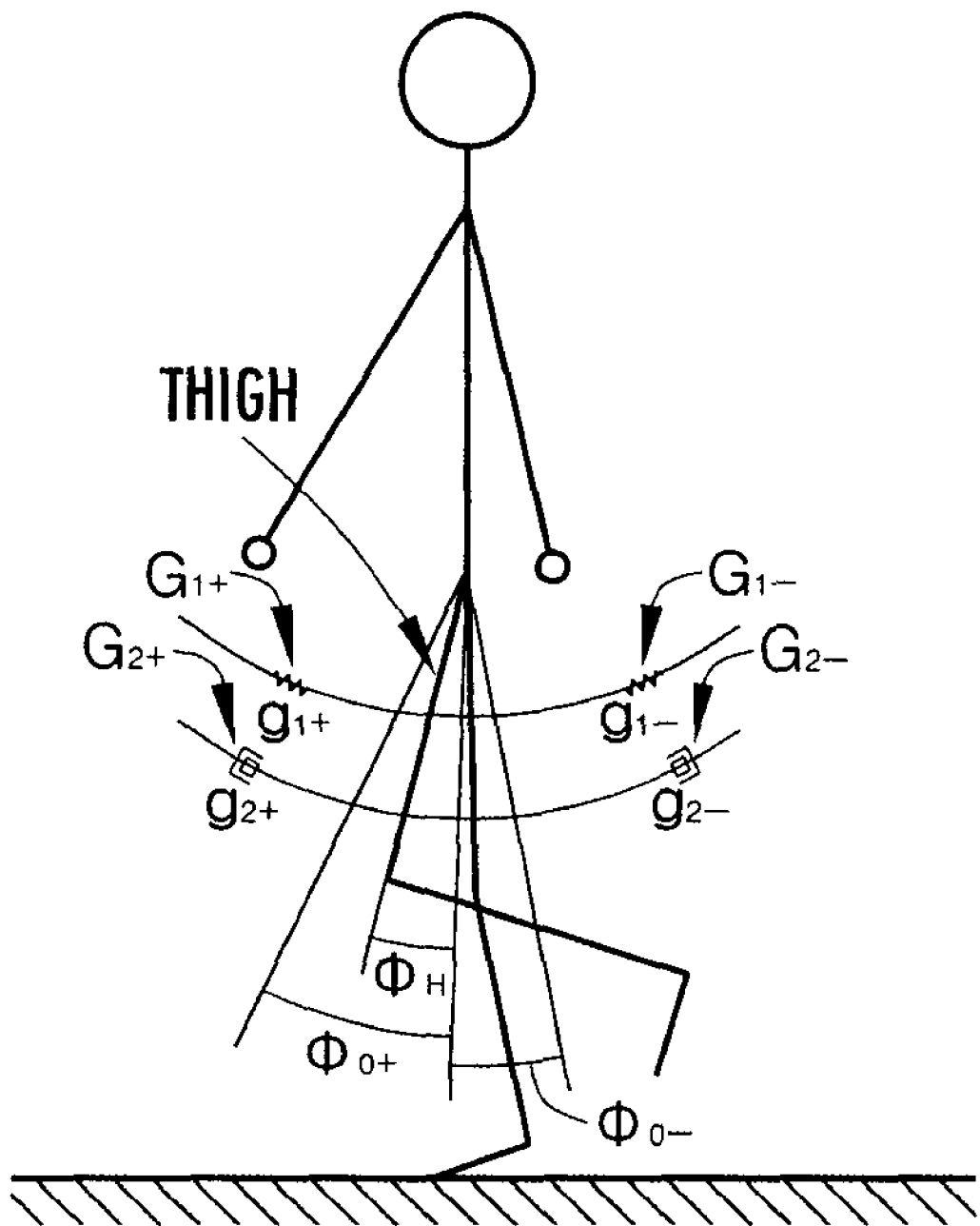
FIG. 4 is an explanatory diagram of virtual springs and dampers related to generation of induction oscillators.

Specifically, a first induction oscillator $z_1$ is generated according to the following expression (4) (s151 in FIG. 2).

$$z_{1L} = g_{1+}(\omega_{mL})g_+(\phi_{HL})y_{L+} - g_{1-}(\omega_{mL})g_-(\phi_{HL})y_{L-},$$

$$z_{1R} = g_{1+}(\omega_{mR})g_+(\phi_{HR})y_{R+} - g_{1-}(\omega_{mR})g_-(\phi_{HR})y_{R-} \qquad (4)$$

where "$g_{1+}$", "$g_{1-}$", "$g_+$", and "$g_-$" are functions defined by the following expressions (4.1) to (4.4), respectively.

$$g_{1+}(\omega) \equiv \Sigma_k a_{k+}\omega^k (a_{k+}: \text{coefficient}, k=0 \text{ to } 3) \qquad (4.1)$$

$$g_{1-}(\omega) \equiv \Sigma_k a_{k-}\omega^k (a_{k-}: \text{coefficient}, k=0 \text{ to } 3) \qquad (4.2)$$

$$g_+(\phi) \equiv c_{1+}(\phi-\phi_{0+}) + c_{2+}(\phi-\phi_{0+})^3 (c_{1+}, c_{2+}: \text{coefficient};$$
$\phi_{0+}$: target value of hip joint angle $\phi_H$ in bending direction) $\qquad (4.3)$ $$g_-(\phi) \equiv c_{1-}(\phi-\phi_{0-}) + c_{2-}(\phi-\phi_{0-})^3 (c_{1-}, c_{2-}: \text{coefficient};$$
$\phi_{0-}$: target value of hip joint angle $\phi_H$ in stretching direction) $\qquad (4.4)$ The first induction oscillator $z_1$ is understood as an elastic force obtained by two virtual springs $G_{1+}$ and $G_{1-}$ shown in FIG. 4 having the first coefficients $g_{1+}$ and $g_{1-}$, respectively, as spring coefficients (elastic coefficients). The first coefficients $g_{1+}$ and $g_{1-}$ each specify the gradient of the first potential (potential of the virtual spring (elastic element)) which brings the hip joint angle (motion oscillator responsive to the user's motion scale) $\phi_H$ close to the target value $\phi_{0+}$(>0) and $\phi_0$ (<0) responsive to the target motion scale, according to the natural angular velocity $\omega_M$ (see the expressions (4.1) and (4.2)). That is, the first induction oscillator $z_1$ is represented as an elastic force of an elastic element such as a virtual spring or the like which has the first coefficient $g_{1+}$, $g_{1-}$ responsive to the first potential as the elastic coefficient (spring coefficient) and which restores the value of the hip joint angle $\phi_H$ to the target value $\phi_{0+}$, $\phi_{0-}$. This enables the user's motion to be induced with the rhythm and scale reflecting the elastic elements of the user's body such as the elastic force generated during the transition from the muscle contraction state to the muscle stretch state.

The elastic force of one virtual spring $G_{1+}$ acts on the user's thigh in such a way as to bring the hip joint angle $\phi_H$ close to the target value $\phi_{0+}$ according to its spring coefficient $g_{1+}$ (see the expression (4)). Specifically, if the hip joint angle $\phi_H$ is less than the target value $\phi_{0+}$, the elastic force of the spring $G_{1+}$ acts on the thigh in such a way as to move the thigh in the direction of increasing the hip joint angle $\phi_H$ (forward). If the hip joint angle $\phi_H$ exceeds the target value $\phi_{0+}$, the elastic force of the spring $G_{1+}$ acts on the thigh in such a way as to move the thigh in the direction of decreasing the hip joint angle $\phi_H$ (backward).

The elastic force of the other virtual spring $G_{1-}$ acts on the user's thigh in such a way as to bring the hip joint angle $\phi_H$ close to the target value $\phi_{0-}$ according to its spring coefficient $g_{1-}$ (see the expression (4)). Specifically, if the hip joint angle $\phi_H$ exceeds the target value $\phi_{0-}$, the elastic force of the spring $G_{1-}$ acts on the thigh in such a way as to move the thigh in the direction of decreasing the hip joint angle $\phi_H$ (backward). If the hip joint angle $\phi_H$ is less than the target value $\phi_{0-}$, the elastic force of the spring $G_{1-}$ acts on the thigh in such a way as to move the thigh in the direction of increasing the hip joint angle $\phi_H$ (forward).

Since there are disproportionate outputs from a part among the plurality of second elements i(=L+, L−, R+, R−) according to whether the thigh moves in the forward direction or the backward direction as described above, the undesirable event of the elastic forces of the two virtual springs $G_{1+}$ and $G_{1-}$ canceling out each other is prevented.

That is, when the left thigh is moving forward, the value of the second oscillator $y_{L+}$ corresponding to the second element L+ which governs this movement is greater than the value of the second oscillator $y_{L-}$ corresponding to the other second element L−, and thus, the first induction oscillator $z_{1L}$ represented by the expression (4) becomes as expressed (or is approximated) by the following expression (4a).

$$z_{1L} = g_{1+}(\omega_{mL})g_+(\phi_{HL})y_{L+} \qquad (4a)$$

As such, when the left thigh is moving forward, of the elastic forces of the two virtual springs $G_{1+}$ and $G_{1-}$, the elastic force of the spring $G_{1+}$ which acts on the user's thigh to bring the hip joint angle $\phi_H$ close to the front-side target value $\phi_{0+}$ is reflected preponderantly, and thus, the undesirable cancellation of the elastic forces of the two virtual springs $G_{1+}$ and $G_{1-}$ with each other is avoided.

Meanwhile, when the left thigh is moving backward, the output of the second element L− which governs this movement becomes greater than the output of the other second element L+, so that the value of the second oscillator $y_{L-}$ corresponding to the second element L− becomes greater than the value of the second oscillator $y_{L+}$ corresponding to the second element L+, and accordingly, the first induction oscillator $z_{1L}$ represented by the expression (4) becomes as expressed (or is approximated) by the following expression (4b).

$$z_{1L} = -g_{1-}(\omega_{mL})g_{-}(\phi_{HL})y_{L-} \qquad (4b)$$

As such, when the left thigh is moving backward, of the elastic forces of the two virtual springs $G_{1+}$ and $G_{1-}$, the elastic force of the virtual spring $G_{1-}$ which acts on the user's thigh to bring the hip joint angle $\phi_H$ close to the back-side target value $\phi_{0-}$ is reflected preponderantly, and thus, the undesirable cancellation of the elastic forces of the two virtual springs $G_{1+}$ and $G_{1-}$ with each other is avoided.

The same applies to the movement of the right leg (thigh).

Alternatively, it is possible to incorporate the sigmoid function fs having the hip joint angular velocity $d\phi_H/dt$ as a variable (see the expression (3)) into the first coefficients $g_{1+}$, $g_{1-}$, and thus to generate a first torque $T_1$ in such a way as to preponderantly reflect part of the second oscillators $y_i$ being outputs of a plurality of second elements i, according to the movement of the thigh in the forward or backward direction which is specified by the polarity of the hip joint angular velocity $d\phi_H/dt$. In this manner as well, it is possible to avoid the undesirable event that the elastic forces of the two virtual springs $G_{1+}$ and $G_{1-}$ cancel out each other.

The target values $\phi_{0+}$ and $\phi_{0-}$ of the hip joint angle $\phi_H$ are set according to geometrical conditions for the posture of the user's leg, including the hip joint angle $\phi_H$, in accordance with a target motion scale (length of step) set by the target motion setting portion 111. Further, the coefficients $a_{k+}$ and $a_{k-}$ included respectively in the first coefficients $g_{1+}(\omega_M)$ and $g_{1-}(\omega_M)$ which are the functions of the natural angular velocity $\omega_M$ may be set as coefficients corresponding to a target motion rhythm (walking rate (=number of steps per unit time (e.g., one minute))) set by the target motion setting portion 111.

Alternatively, the target values $\phi_{0+}$ and $\phi_{0-}$ of the hip joint angle $\phi_H$ may be set according to the geometrical conditions for the posture of the user's leg, including the hip joint angle $\phi H$, on the basis of a target "length of step" set by the user through an operation of a setting button (not shown) provided in the walking assist device 200. Furthermore, the coefficients $a_{k+}$ and $a_{k-}$ included respectively in the first coefficients $g_{1+}(\omega_M)$ and $g_{1-}(\omega_M)$ may be set on the basis of a target "walking rate" set by the user through an operation of a setting button (not shown) provided in the walking assist device 200.

Furthermore, a second induction oscillator $z_2$ is set according to the following expression (5) (s152 in FIG. 2).

$$z_{2L} = -g_{2+}(\omega_{mL})(d\phi_{HL}/dt)H_{+}(\phi_{HL})y_{L+} + \qquad (5)$$
$$g_{2-}(\omega_{mL})(d\phi_{HL}/dt)H_{-}(\phi_{HL})y_{L-},$$
$$z_{2R} = -g_{2+}(\omega_{mR})(d\phi_{HR}/dt)H_{+}(\phi_{HR})y_{R+} +$$
$$g_{2-}(\omega_{mR})(d\phi_{HR}/dt)H_{-}(\phi_{HR})y_{R-}$$

where "$g_{2+}$", "$g_{2-}$", "$H_{+}$", and "$H_{-}$" are functions defined by the following expressions (5.1) to (5.4), respectively.

$$g_{2+}(\omega) = \Sigma_k b_{k+}\omega^k (b_{k+}: \text{coefficient, k=0 to 3}) \qquad (5.1)$$

$$g_{2-}(\omega) = \Sigma_k b_{k-}\omega^k (b_{k-}: \text{coefficient, k=0 to 3}) \qquad (5.2)$$

$$H_{+}(\phi) = 0(\phi \leq 0), 1(\phi > 0) \qquad (5.3)$$

$$H_{-}(\phi) = 0(\phi > 0), 1(\phi \leq 0) \qquad (5.4)$$

The second induction oscillator $z_2$ is understood as a damping force obtained by two virtual dampers $G_{2+}$ and $G_{2-}$ shown in FIG. 4 having the second coefficients $g_{2+}$ and $g_{2-}$, respectively, as damper coefficients (damping coefficients). The second coefficients $g_{2+}$ and $g_{2-}$ each specify the gradient of the second potential (potential of the virtual damper (damping element)) which prevents an increase in absolute value of the hip joint angle $\phi_H$, according to the natural angular velocity $\omega_M$ (see the expressions (5.1) and (5.2)). That is, the second induction oscillator $z_2$ is represented as a damping force of a damping element such as a virtual damper or the like which has the second coefficients $g_{2+}$, $g_{2-}$ responsive to the second potential as the damping coefficient (damper coefficient) and which prevents an increase in absolute value of the hip joint angle $\phi_H$, according to the hip joint angular velocity $d\phi_H/dt$. This enables the user's motion to be induced with the rhythm and scale reflecting the damping elements of the user's body such as the viscous force generated during the transition from the muscle stretch state to the muscle flexed state.

The damping force of one virtual damper $G_{2+}$ acts on the user's thigh in such a way as to prevent an increase in absolute value of the hip joint angle $\phi_H$ toward the front side (inflection side), according to the damper coefficient $g_{2+}$ and the hip joint angular velocity $d\phi_H/dt$ (see the expression (5)). In other words, the damping force of the virtual damper $G_{2+}$, acts on the thigh in such a way as to prevent excessive forward movement of the thigh.

The damping force of the other virtual damper $G_{2-}$ acts on the user's thigh in such a way as to prevent an increase in absolute value of the hip joint angle $\phi_H$ toward the back side (stretch side), according to the damper coefficient $g_{2-}$ and the hip joint angular velocity $d\phi_H/dt$ (see the expression (5)). In other words, the damping force of the virtual damper $G_{2-}$ acts on the thigh in such a way as to prevent excessive backward movement of the thigh.

Furthermore, the second induction oscillator $z_2$ includes step functions $H_{+}$ and $H_{-}$ as the functions of the hip joint angle $\phi_H$. Therefore, it is possible to avoid such a situation that the damping forces of the two virtual dampers $G_{2+}$ and $G_{2-}$ cancel out each other.

The coefficients $b_{k+}$ and $b_{k-}$ included respectively in the second coefficients $g_{2+}(\omega_M)$ and $g_{2-}(\omega_M)$ which are the functions of the natural angular velocity $\omega_M$ may be set as coefficients corresponding to a target motion rhythm set by the target motion setting portion 111. Alternatively, the coefficients $b_{k+}$ and $b_{k-}$ may be set on the basis of a target "walking rate" set by the user through an operation of a setting button (not shown) provided in the walking assist device 200.

Then, a current I=($I_L$, $I_R$) corresponding to the induction oscillator z(=$z_1$+$z_2$) including the first induction oscillator $z_1$=($z_{1L}$, $z_{1R}$) and the second induction oscillator $z_2$=($z_{2L}$, $z_{2R}$) generated by the induction oscillator generation portion 150 is supplied from the battery 206 to each of the left and right actuators 210, and a force (torque around the hip joint) F acts on the corresponding thigh of the user.

Thereafter, the above processes (s101, s102, . . . , s150 in FIG. 2) are repeated, whereby the walker walks while being applied with the torque F around the hip joint by the walking assist device 200.

According to the walking assist device 200 and its control system 100 of the present invention exerting the above-described functions, the user's motion can be induced in such a way as to match the user's motion rhythm with its target rhythm, primarily for the following reasons.

By virtue of the effect of "mutual entrainment" which is one of the properties of the van der Pol equation (see the expression (1)), the first oscillator x is generated as one that oscillates (changes with respect to time) in an autonomous rhythm reflecting the natural angular velocity $\omega_M$, while harmonizing with the rhythm of the user's hip joint angular velocity (motion oscillator) $d\phi_H/dt$.

Meanwhile, the first oscillator x may have an inappropriate phase difference relative to the user's hip joint angular velocity $d\phi_H/dt$ from the viewpoint of matching the user's walking motion rhythm with a target rhythm while harmonizing the user's walking motion rhythm with the rhythm of inducing the motion by the device. As such, if the induction oscillator z is generated directly from the first oscillator x, the user's walking motion rhythm induced by the torque F around the hip joint in accordance with the induction oscillator z may deviate from the target rhythm.

Accordingly, the relationship between the two virtual oscillators $\theta_h$ and $\theta_m$ is set so as to correspond to the phase difference (first phase difference) $\delta\theta_1$ between the user's hip joint angular velocity $d\phi_H/dt$ and the first oscillator x. Specifically, the correlation coefficient $\epsilon$ in the virtual model is set on the basis of the first phase difference $\delta\theta_1$ (s133 in FIG. 2). Further, the angular velocities $\omega_h$ and $\omega_m$ of the two oscillators $\theta_h$ and $\theta_m$ are set in such a way as to bring the phase difference (second phase difference) $\delta\theta_2$ between the two oscillators $\theta_h$ and $\theta_m$ close to the target phase difference $\delta\theta_0$, and the latter is set as a new natural angular velocity $\omega_M$ (s134, s135 in FIG. 2). Accordingly, the new natural angular velocity $\omega_M$ becomes equivalent to an angular velocity of an appropriate oscillator from the viewpoint of inducing the user's motion in such a way as to match the user's motion rhythm with the target rhythm, while harmonizing with the user's motion rhythm specified by the hip joint angular velocity $d\phi_1/dt$, according to the target phase difference $\delta\theta_0$. Thereafter, generation of a first oscillator x in such a way as to reflect a new natural angular velocity $\omega_M$ (s110 in FIG. 2) is repeated, which can gradually reduce the deviation of the first phase difference $\delta\theta_1$ from the target phase difference $\delta\theta_0$, while harmonizing the rhythm of the motion oscillator such as the hip joint angle $\phi_H$ with the rhythm of the first oscillator x. In this manner, even if the user's motion rhythm changes suddenly, appropriate followability of the induction oscillator T to such a change can be ensured for the purposes of preventing the user from feeling uncomfortable, and thus, it is possible to cause the user's motion rhythm to gradually coincide with the target rhythm at a moderate pace.

Subsequently, the second oscillator $y_i$ is generated in such a way as to reflect the newly set natural angular velocity $\omega_M$ (s140 in FIG. 2). Further, the induction oscillator z including the second oscillator $y_i$ is generated (s150 in FIG. 2). In this manner, it is possible to match the user's motion rhythm induced by the torque F applied to the thigh in accordance with the induction oscillator z with the target rhythm, while harmonizing the user's motion rhythm with the guide rhythm. This means that the guide rhythm by the walking assist device 200 is harmonized with the user's motion rhythm, and the user's motion rhythm is also harmonized with the guide rhythm by the walking assist device 200, and therefore, harmonization (mutual adaptation) is established between the user (human) and the device (machine).

Moreover, as the user's motion is induced such that the phase difference between the user's motion oscillator and the induction oscillator z by the walking assist device 200 coincides with a positive target phase difference, the user is allowed to walk (move) in such a way as to lead the walking assist device 200. Furthermore, as the user's motion is induced such that the phase difference between the user's motion oscillator and the induction oscillator z by the walking assist device 200 coincides with a negative target phase difference, the user is allowed to walk (move) in such a way as to be lead by the walking assist device 200.

According to the walking assist device 200 and its control system 100 of the present invention exerting the above-described functions, the user's motion can be induced in such a way as to match the user's motion scale with its target scale, primarily for the following reasons.

The first coefficients $g_{1+}$ and $g_{1-}$ included in the first induction oscillator $z_1$ are provided according to the first potential (potential of the virtual elastic element) for bringing the user's hip joint angle $\phi_H$ close to its target values $\phi_{0+}$ and $\phi_{0-}$. Further, the first coefficients $g_{1+}$ and $g_{1-}$ are provided according to the natural angular velocity $\theta_m$ (=angular velocity $\omega_m$ of the virtual induction oscillator $\theta_m$) (see the expressions (4.1) and (4.2)). The natural angular velocity $\omega_M$ corresponds to an angular velocity of an appropriate oscillator from the viewpoint of inducing the user's motion in such a way as to match the user's motion rhythm with the target rhythm while harmonizing with the user's motion rhythm, as described above.

Moreover, the second coefficients $g_{2+}$ and $g_{2-}$ included in the second induction oscillator $z_2$ are provided according to the second potential (potential of the virtual damping element) for preventing an increase in absolute value of the hip joint angle $\phi_H$. Further, the second coefficients $g_{2+}$ and $g_{2-}$ are provided according to the natural angular velocity $\omega_M$ (see the expressions (5.1) and (5.2)). The natural angular velocity $\omega_M$ corresponds to an angular velocity of an appropriate oscillator from the viewpoint of inducing the user's motion in such a way as to match the user's motion rhythm with the target rhythm while harmonizing with the user's motion rhythm, as described above.

Therefore, the first induction oscillator $z_1$ is generated by reflecting the first coefficients $g_{1+}(\omega_M)$ and $g_{1-}(\omega_M)$ according to the new natural angular velocity $\omega_M$ and the second induction oscillator $z_2$ is generated by reflecting the second coefficients $g_{2+}(\omega_M)$ and $g_{2-}(\omega_M)$ according to the natural angular velocity $\omega_M$, whereby the user's motion can be induced in such a way as to bring the user's motion scale close to the target scale, while harmonizing the user's motion rhythm with the rhythm of the induction oscillator z and while matching the user's motion rhythm with the target rhythm.

As described above, according to the walking assist device (motion induction device) 200 of the present invention, it is possible to guide the user's motion in such a way that the rhythm and scale of the user's motion coincide respectively with the target rhythm and scale.

The coefficients ($\phi_{0+}, \phi_{0-}, a_{k+}, a_{k-}, b_{k+}, b_{k-}, \ldots$) and the like corresponding to the user's target motion rhythm and scale are set in accordance with the user's walking state (s111 in FIG. 2). Accordingly, the user's motion can be induced with appropriate rhythm and scale from the viewpoint of matching the user's motion rhythm and scale with the target rhythm and scale corresponding to the user's "walking state".

Further, the target phase difference $\delta\theta_0$ is set in accordance with the user's walking state (s112 in FIG. 2). Accordingly, the user's motion can be induced in such a way that the phase difference between the user's hip joint angular velocity $d\phi_H/dt$ and the induction oscillator z (and hence the torque F around the hip joint) by the walking assist device 200 approaches the target phase difference $\delta\theta_0$ corresponding to the user's "walking state". In this manner, the user's motion is induced (assisted) in an appropriated rhythm from the viewpoint of bringing the user's motion rhythm close to the target rhythm, in accordance with a change of the user's walking state.

Furthermore, the first oscillator x is generated as an output of the first element according to the first model which represents the relationship between a plurality of virtual first elements (left and right legs) whose outputs vary according to the motion oscillators such as the hip joint angular velocity $d\phi_H/dt$ (the expression (1), s120 in FIG. 2). This allows the relationship between a plurality of actual elements concerning a user's actual motion to be reflected to the correlation represented by the coefficient g of the plurality of virtual first elements and the like in the first model, and accordingly, an appropriate first oscillator x in view of the relationship between the plurality of actual elements can be generated. For example, in the case where the left and right legs or a plurality of joints in the same leg are assumed as the plurality of actual elements, the first oscillator x is generated so as to reflect the qualitative relationship between the left and right legs such as their moving back and forth alternately or the like, or the qualitative relationship between the joints of the same leg such as the period or phase difference between the leg motion around the hip joint and the leg motion around the knee joint. Therefore, the rhythm and scale of the induction oscillator inducing the user's motion can be made appropriate in view of the relationship concerned.

Furthermore, the second oscillator $y_i$ is generated as an output of the second element according to the second model which represents the relationship between a plurality of virtual second elements whose outputs vary according to the motion oscillators such as the hip joint angular velocity $d\phi_H/dt$ (the expression (3), s140 in FIG. 2). This allows the relationship between a plurality of actual elements concerning a user's actual motion to be reflected to the correlation represented by the coefficient $w_{i/j}$ of the plurality of virtual second elements in the second model, whereby an appropriate second oscillator can be generated in view of the relationship between the plurality of actual elements. For example, in the case where a plurality of user's neurons are assumed as the actual plural elements, the second oscillator $y_i$ is generated so as to reflect the qualitative relationship between the neurons which govern the walking by the left and right legs or the like. Therefore, the rhythm and scale of the induction oscillator inducing the user's motion can be made appropriate in view of the relationship concerned.

Hereinafter, the operation and effect of the walking assist device 200 of the present invention capable of inducing the user's motion in such a way as to match the user's motion rhythm and scale with the target rhythm and scale will be described with reference to FIGS. 5 and 6.

Figure 5:
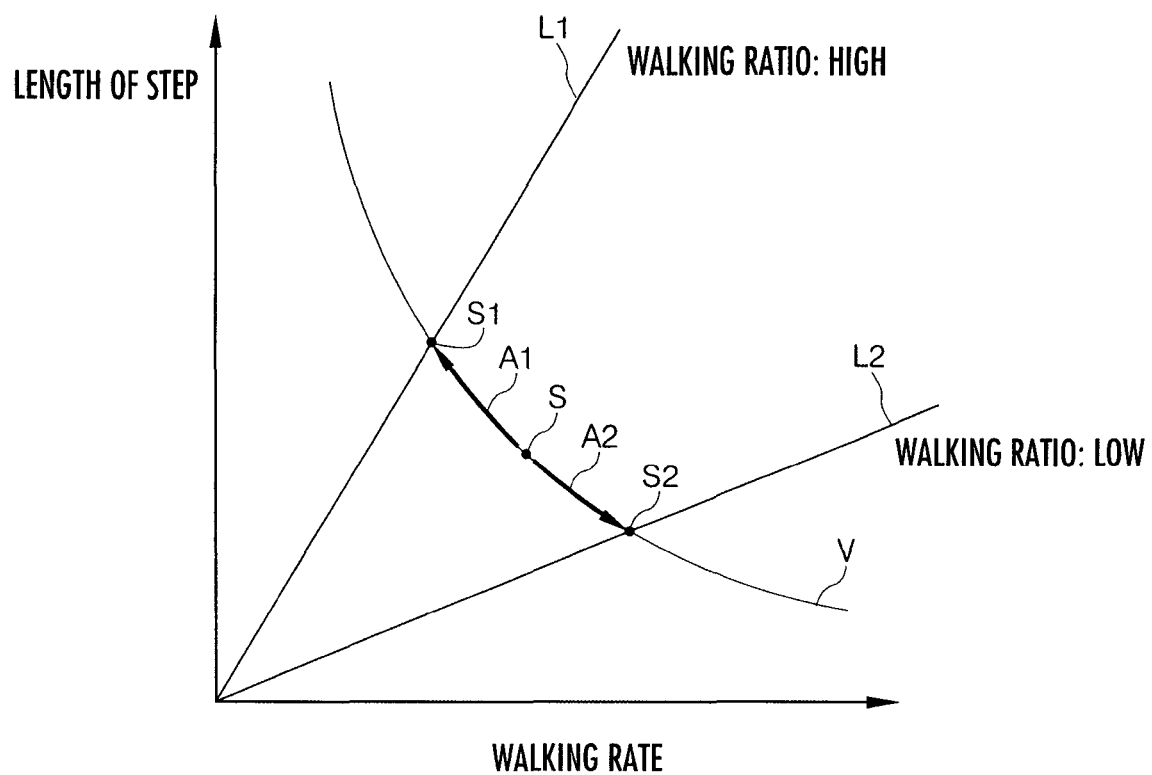
FIG. 5 is a conceptual explanatory diagram related to the operation and effect of the motion induction device according to the present invention.
Figure 6:
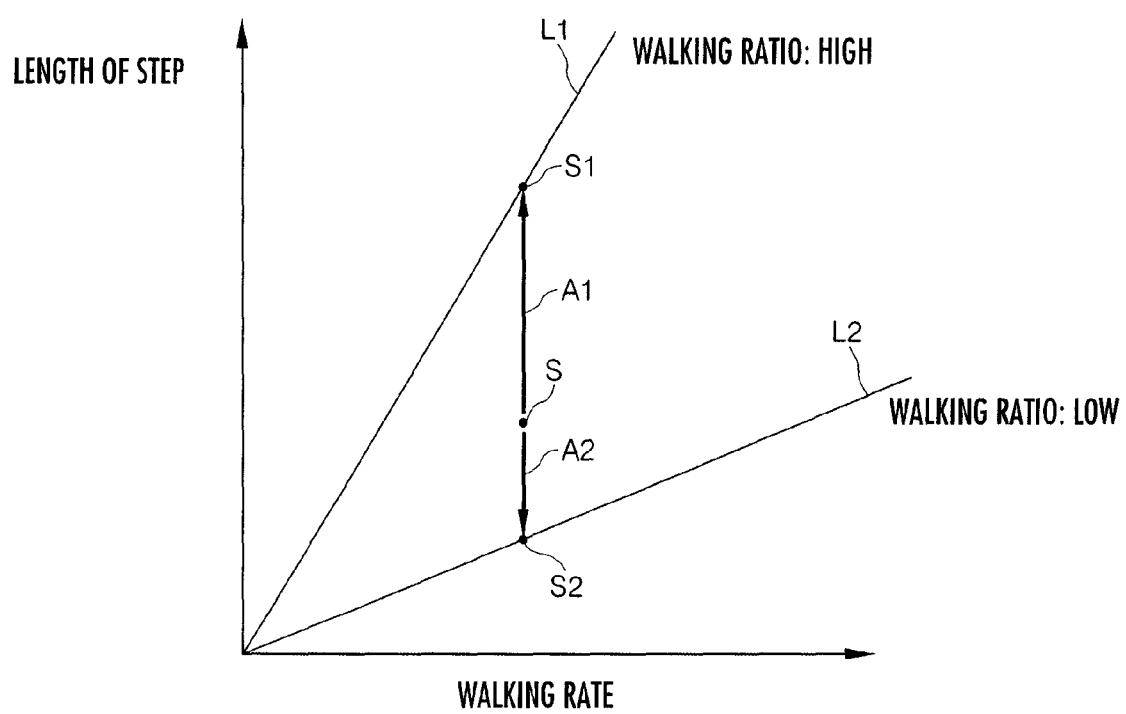
FIG. 6 is another conceptual explanatory diagram related to the operation and effect of the motion induction device according to the present invention.

The above operation and effect mean that a "walking ratio (=length of step/walking rate)" represented as an inclination of a straight line (for example, straight lines $L_1$, $L_2$) passing through the origin point in the "walking rate"–"length of step" plane, as shown in FIGS. 5 and 6, coincides with a target walking ratio. This is for the following reason that, since the walking rate and the length of step each represent the rhythm and scale of the user's walking (motion), if the rhythm and scale of the user's walking motion match the target rhythm and scale, then the correlation between the rhythm and scale of the user's walking motion will match the correlation between the target rhythm and scale.

For example, assume that the user is walking at the "speed (=walking rate/length of step)" represented by the hyperbola v shown in FIG. 5 and at the "walking rate" and the "length of step" represented by the point s on the hyperbola v. When the speed represented by the hyperbola v is set as a target and the walking ratio represented by the straight line $L_1$ is set as a target, then the user's motion is induced (assisted) by the walking assist device 200 in such a way that the user walks at the walking rate and the length of step represented by the crossing point $s_1$ of the hyperbola v and the straight line $L_1$ (see the arrow A1 in FIG. 5). That is, the user's walking state is gradually induced to the state where the user walks slowly with large steps, while the walking speed being maintained. Further, in this state, if the speed represented by the hyperbola v is set as a target and the walking ratio represented by the straight line $L_2$ is set as a target, then the user's motion is induced (assisted) by the walking assist device 200 in such a way that the user walks at the walking rate and the length of step represented by the crossing point S2 of the inversely proportional curve v and the straight line $L_2$ (the arrow A2 in FIG. 5). In this manner, the user's walking state is gradually induced to the state where the user walks rapidly with small steps, while the walking speed being maintained.

Further, assume the state where the user is walking at the "walking rate" and the "length of step" represented by the point s shown in FIG. 6. In the case where the walking rate represented by the vertical straight line passing through the point s is set as a target and the walking ratio represented by the straight line $L_1$ is set as a target, then the user's motion is induced (assisted) by the walking assist device 200 in such a way that the user walks at the walking rate and the length of step represented by the crossing point $s_1$ of the vertical straight line and the straight line $L_1$ (see the arrow A1 in FIG. 6). That is, the user's walking state is gradually induced to the state where the user walks with large steps, maintaining the walking rhythm. Further, in this state, if the walking rate represented by the vertical straight line passing through the point s is set as a target and the walking ratio represented by the straight line $L_2$ is set as a target, then the user's motion is induced (assisted) by the walking assist device 200 in such a way that the user walks at the walking rate and the length of step represented by the crossing point S2 of the vertical straight line and the straight line $L_2$ (the arrow A2 in FIG. 6). That is, the user's walking state is gradually induced to the state where the user walks with small steps, while maintaining the walking rhythm.

Figure 7:
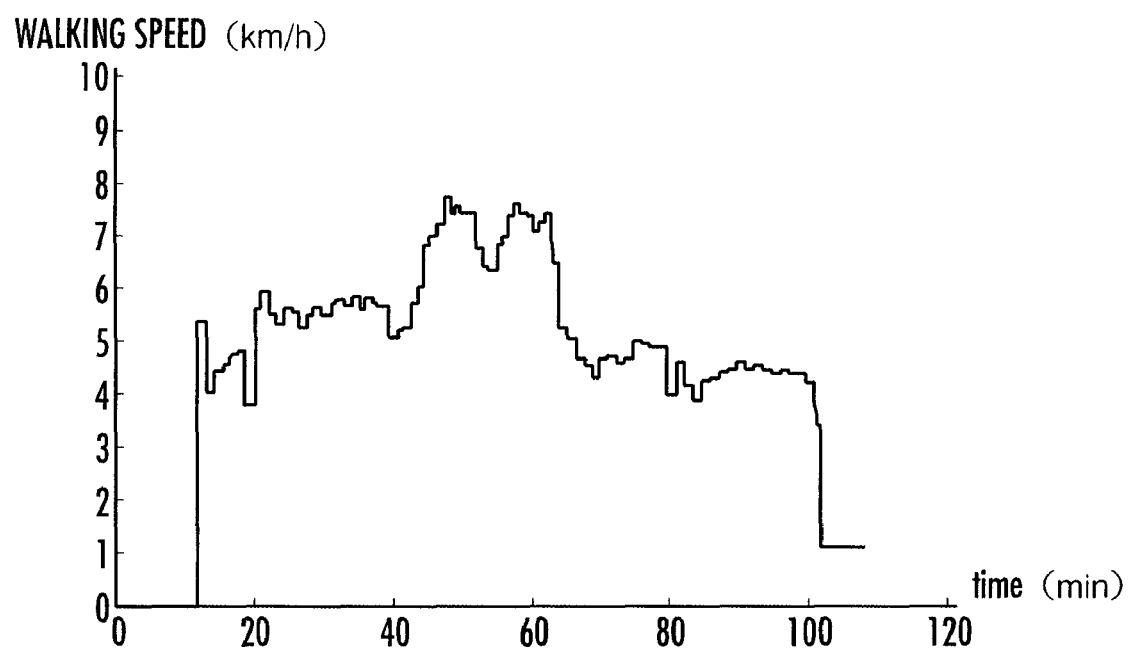
FIG. 7 is an explanatory diagram showing an experimental result of the operation and effect of the motion induction device according to the present invention.

Now, experimental results related to the above-described operation and function of the walking assist device 200 of the present invention will be described with reference to FIGS. 7-9.

In the experiment, the target walking ratio was set to "0.0072". The user having the walking assist device 200 shown in FIG. 1 attached thereto walked while changing the speed as shown in FIG. 7. Specifically, the user's walking speed was initially maintained at a substantially constant speed, then increased, then slightly decreased, then increased again, then decreased again, and was lastly maintained at a substantially constant speed.

Figure 8:
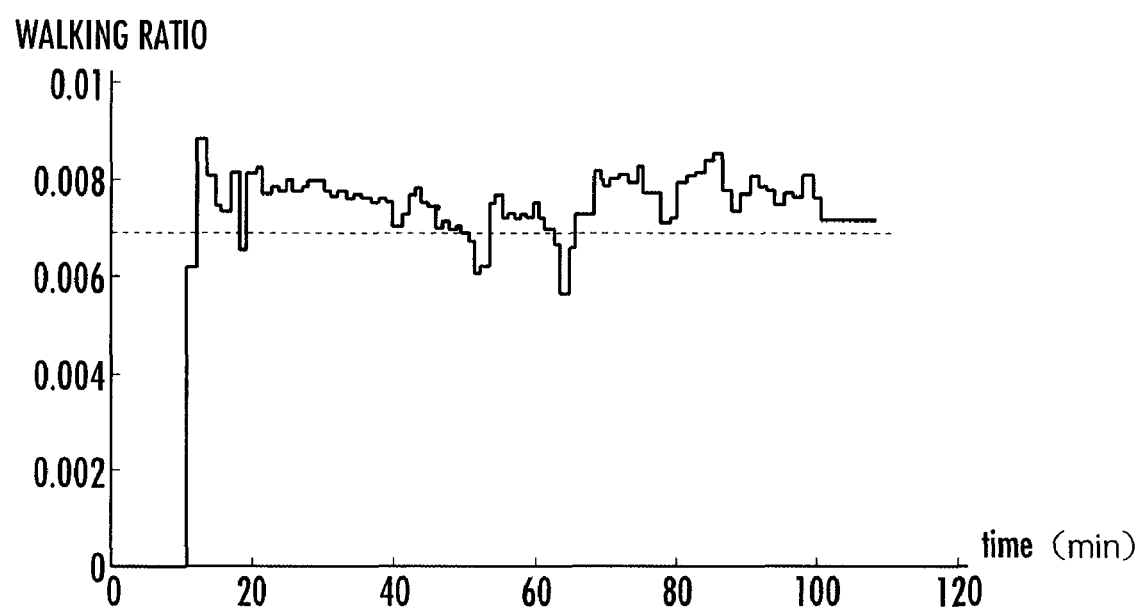
FIG. 8 is another explanatory diagram showing an experimental result of the operation and effect of the motion induction device according to the present invention.

As a result, the user's walking ratio has changed, as shown in FIG. 8, to substantially converge to the target value of 0.0072, although it is more or less deviated from the target value according to the increase/decrease of the user's walking speed. In other words, as shown in FIG. 9, the track of the point representing the user's walking state on the walking rate-length of step plane is depicted to converge to a straight line representing the target walking rate of 0.0072. As evident from the experimental results, according to the walking assist device (motion induction device) 200 of the present invention, the user's walking can be induced in such a way that the user's walking motion rhythm and scale coincide with the target rhythm and scale.

While the user's walking is induced in the above embodiment, another movement of the user may be assisted in another embodiment. For example, in the case where the manual work related to manufacture of products such as automobiles is to be induced, the user can perform the work with a target motion rhythm and a target motion scale (or level of force) according to the induction oscillator. When the target motion rhythm and scale are set based on the manual work by a skilled person or the like, it is possible to give the user the feelings of the subtle movements and level of force of the hands of the skilled person, and thus to accelerate the learning of the techniques.

While the torques $F=(F_L, FR)$ around the left and right hip joints are applied to the user's body according to the induction oscillator z in the above embodiment, torques around various joints such as the knee joint, ankle joint, shoulder joint, elbow joint, and carpal joint can be applied to the user's body in another embodiment. The combination of the joints to be applied with the torques can be altered in various ways according to the user's demand. Furthermore, in another embodiment, it is possible to provide the user with: a periodic sound, according to the induction oscillator z, audibly perceptible by a walker through an audio device (not shown) such as a headphone; a periodic light or sign, according to the induction oscillator z, perceptible through a visual device (not shown) such as goggles; or a periodic knock, according to the induction oscillator z, perceptible by the walker through some tactile senses of the body such as his/her back or shoulder by means of a massager or the like.

Although an increase in type of the motion oscillators to be measured leads to an increase in number of correlation terms in the nonlinear differential equation (the expression (1)) based on the generation of the first oscillator x such as a van del Pol equation or in the nonlinear differential equation (the expression (3)) based on the generation of the second oscillator $y_i$, adjustment of the correlation coefficient enables more careful motion guide in consideration of the movements of various parts of the user's body.

In the above embodiment, the user's "walking state (motion state)" is measured and, based on the measurement results, the coefficients ($\phi_{0+}$, $\phi_{0-}$, $a_{k+}$, $a_{k-}$, $b_{k+}$, $b_{k-}$, . . . ) corresponding to the target motion rhythm and scale as well as the target phase difference $\delta\theta_0$ are set (s110, s111 and s112 in FIG. 2). Alternatively, in another embodiment, the user's "physiological state" may be measured and the coefficients corresponding to the target motion rhythm and scale as well as the target phase difference $\delta\theta_0$ may be set according to the measurement results. The user's physiological state may include a state where the user's degree of fatigue is high, a state where the user's degree of fatigue is low, a state where the user's heart rate or perspiration amount is high, a state where the user's heart rate is low, and the like.

Moreover, the control system 100 of the walking assist device 200 may further include a first correlation adjustment portion which adjusts the coefficient g (correlation between a plurality of virtual first elements) in the first model according to one or both of the user's motion state and physiological state determined by the state measurement portion 110. Furthermore, the control system 100 of the walking assist device 200 may further include a second correlation adjustment portion which adjusts the coefficient $w_{ij}$ (correlation between a plurality of virtual second elements (virtual neural elements)) in the second model according to one or both of the user's motion state and physiological state determined by the state measurement portion 110.

According to the motion induction device of the present invention, the user's motion can be induced in real time with appropriate rhythm and scale according to the user's state, so as to reflect the fact that the relationship between a plurality of actual elements such as the left and right legs and the like varies according to the user's "motion state" and/or "physiological state."

The invention claimed is:

1. A motion induction device for inducing a user's motion according to an induction oscillator, comprising:
   a motion oscillator measurement unit which measures first and second motion oscillators as parameters which change with respect to time according to a motion of a body of the user, and a third motion oscillator as a parameter which changes with respect to time according to a motion of the body of the user and representing a motion scale of the user;
   a first oscillator generation unit which generates a first oscillator as an output oscillator signal by inputting the first motion oscillator measured by the motion oscillator measurement unit as an input oscillator signal into a first model which attains mutual entrainment with the input oscillator signal and generates the output oscillator signal which changes with respect to time according to an angular velocity defined on the basis of a natural angular velocity;
   a natural angular velocity setting unit which newly sets the natural angular velocity so as to bring a first phase difference close to a target phase difference, the first phase difference being a phase difference between the first motion oscillator measured by the motion oscillator measurement unit and the first oscillator generated by the first oscillator generation unit;
   a second oscillator generation unit which generates a second oscillator as an output oscillator signal by inputting the second motion oscillator measured by the motion oscillator measurement unit as an input oscillator signal into a second model which generates the output oscillator signal which changes with respect to time according to an angular velocity defined on the basis of the natural angular velocity, the natural angular velocity being set by the natural angular velocity setting unit on the basis of the input oscillator signal;
   an induction oscillator generation unit which generates a first induction oscillator representing an elastic force by a virtual elastic element for inducing the user's motion so as to bring a value of the third motion oscillator measured by the motion oscillator measurement unit close to a target value responsive to a target motion scale of the user according to the second oscillator generated by the second oscillator generation unit and the natural angular velocity set by the natural angular velocity setting unit, and generates the induction oscillator including the first induction oscillator; and
   an actuator configured to induce the user's motion according to at least the generated induction oscillator via an orthosis portion.

2. The motion induction device according to claim 1, wherein the motion oscillator measurement unit measures a time derivative of the third motion oscillator as a fourth motion oscillator, and wherein the induction oscillator generation unit generates a second induction oscillator representing a damping force of a virtual damping element for inducing the user's motion so as to prevent an increase in absolute value of the third motion oscillator according to the second oscillator generated by the second oscillator generation unit, the natural angular velocity set by the natural angular velocity setting unit, and the fourth motion oscillator measured by the motion oscillator measurement unit, and generates the induction oscillator further including the second induction oscillator.

3. The motion induction device according to claim 1, wherein the induction oscillator generation unit generates the first induction oscillator as the elastic coefficient of the virtual elastic element, including an oscillator calculated as a product of a first coefficient as a function of the natural angular velocity set by the natural angular velocity setting unit, a function of a deviation of the third motion oscillator value from the target value, and the second oscillator.

4. The motion induction device according to claim 2, wherein the induction oscillator generation unit generates the second induction oscillator as the damping coefficient of the virtual damping element, including an oscillator calculated as a product of a second coefficient as a function of the natural angular velocity set by the natural angular velocity setting unit, a function of the fourth motion oscillator, and the second oscillator.

5. The motion induction device according to claim 1, wherein the first model, by attaining mutual entrainment with a plurality of the input oscillator signals, is represented by a first simultaneous equation including a term multiplying a first correlation coefficient to each of a plurality of the output oscillator signals which change with respect to time according to the angular velocity defined on the basis of the natural angular velocity,
wherein the motion oscillator measurement unit measures a plurality of the first motion oscillators, and
wherein the first oscillator generation unit generates a plurality of the first oscillators as the plurality of output oscillator signals by inputting the plurality of first motion oscillators measured by the motion oscillator measurement unit as the plurality of input oscillator signals to the first model.

6. The motion induction device according to claim 1, wherein the second model, on the basis of a plurality of the output oscillator signals, is represented by a second simultaneous equation including a term multiplying a second correlation coefficient to a plurality of the output oscillator signals which oscillate according to the angular velocity defined on the basis of the natural angular velocity set by the natural angular velocity setting unit,
wherein the motion oscillator measurement unit measures a plurality of the second motion oscillators, and
wherein the second oscillator generation unit generates a plurality of the second oscillators as the plurality of output oscillator signals by inputting the plurality of second motion oscillators measured by the motion oscillator measurement unit as the plurality of input oscillator signals to the second model.

7. The motion induction device according to claim 1, wherein the natural angular velocity setting unit sets, on the basis of the first phase difference, an angular velocity of one of two oscillators which are two oscillator signals in a virtual model as a new natural angular velocity of the natural angular velocity in such a way as to bring a second phase difference corresponding to a phase difference between the two oscillators close to a target phase difference.

8. The motion induction device according to claim 7, wherein the virtual model is represented by a simultaneous equation including a term multiplying a correlation coefficient to the two oscillators,
wherein the natural angular velocity setting unit includes,
a correlation coefficient setting unit which sets the correlation coefficient on the basis of the first phase difference, a first angular velocity setting unit which sets an angular velocity of one of the two oscillators, on the basis of the correlation coefficient set by the correlation coefficient setting unit, in such a way as to minimize a difference between the first phase difference and the second phase difference, and
a second angular velocity setting unit which sets an angular velocity of the other of the two oscillators as the new natural angular velocity, on the basis of the angular velocity set by the first angular velocity setting unit, in such a way as to minimize a difference between the second phase difference and the target phase difference.

9. The motion induction device according to claim 1, wherein the induction oscillator generation unit generates the first induction oscillator in order to induce the user motion in such a way as to further bring the third motion oscillator value measured by the motion oscillator measurement unit close to the target value according to a target motion rhythm of the user, and generates the induction oscillator including the first induction oscillator.

10. The motion induction device according to claim 2, wherein the induction oscillator generation unit generates the second induction oscillator in order to induce the user's motion in such a way as to further present the increase in absolute value of the third motion oscillator measured by motion oscillator measurement unit according to a target motion rhythm of the user, and generates the induction oscillator including the second induction oscillator.

11. The motion induction device according to claim 1, wherein the motion oscillator measurement unit measures a time derivative of the second motion oscillator as the first motion oscillator.

12. The motion induction device according to claim 1, wherein the motion oscillator measurement unit measures the second motion oscillator as the third motion oscillator.

13. The motion induction device according to claim 2, wherein the motion oscillator measurement unit measures a time derivative of the third motion oscillator as the first motion oscillator.

14. A control system which controls a device for inducing a user's motion according to an induction oscillator, the control system including at least one computer in communication with said device, said at least one computer comprising:
a motion oscillator measurement unit which measures first and second motion oscillators as parameters which change with respect to time according to a motion of a body of the user, and a third motion oscillator as a parameter which changes with respect to time according to a motion of the body of the user and representing a motion scale of the user;
a first oscillator generation unit which generates a first oscillator as an output oscillator signal by inputting the first motion oscillator measured by the motion oscillator measurement unit as an input oscillator signal into a first model which attains mutual entrainment with the input oscillator signal and generates the output oscillator signal which changes with respect to time according to an angular velocity defined on the basis of a natural angular velocity;
a natural angular velocity setting unit which newly sets the natural angular velocity so as to bring a first phase difference close to a target phase difference, the first phase difference being a phase difference between the first motion oscillator measured by the motion oscillator measurement unit and the first oscillator generated by the first oscillator generation unit;

a second oscillator generation unit which generates a second oscillator as an output oscillator signal by inputting the second motion oscillator measured by the motion oscillator measurement unit as an input oscillator signal into a second model which generates the output oscillator signal which changes with respect to time according to an angular velocity defined on the basis of the natural angular velocity, the natural angular velocity being set by the natural angular velocity setting unit on the basis of the input oscillator signal;

an induction oscillator generation unit which generates a first induction oscillator representing an elastic force by a virtual elastic element for inducing the user's motion so as to bring a value of the third motion oscillator measured by the motion oscillator measurement unit close to a target value responsive to a target motion scale of the user according to the second oscillator generated by the second oscillator generation unit and the natural angular velocity set by the natural angular velocity setting unit, and generates the induction oscillator including the first induction oscillator.

15. The control system according to claim 14, wherein the motion oscillator measurement unit measures a time derivative of the third motion oscillator as a fourth motion oscillator, and wherein the induction oscillator generation unit generates a second induction oscillator representing a damping force of a virtual damping element for inducing the user's motion so as to prevent an increase in absolute value of the third motion oscillator according to the second oscillator generated by the second oscillator generation unit, the natural angular velocity set by the natural angular velocity setting unit, and the fourth motion oscillator measured by the motion oscillator measurement unit, and generates the induction oscillator further including the second induction oscillator.

16. A control program recorded on a non-transitory computer-readable medium which provides a computer attached to a device for inducing a user's motion according to an induction oscillator with functions for controlling the device, the functions comprising:

a motion oscillator measurement function of measuring first and second motion oscillators as parameters which change with respect to time according to a motion of a body of the user, and a third motion oscillator as a parameter which changes with respect to time according to a motion of the body of the user and representing a motion scale of the user;

a first oscillator generation function of generating a first oscillator as an output oscillator signal by inputting the first motion oscillator measured by the motion oscillator measurement function as an input oscillator signal into a first model which attains mutual entrainment with the input oscillator signal and generating the output oscillator signal which changes with respect to time according to an angular velocity defined on the basis of a natural angular velocity;

a natural angular velocity setting function of newly setting the natural angular velocity so as to bring a first phase difference close to a target phase difference, the first phase difference being a phase difference between the first motion oscillator measured by the motion oscillator measurement function and the first oscillator generated by the first oscillator generation function;

a second oscillator generation function of generating a second oscillator as an output oscillator signal by inputting the second motion oscillator measured by the motion oscillator measurement function as an input oscillator signal into a second model which generates the output oscillator signal which changes with respect to time according to an angular velocity defined on the basis of the natural angular velocity, the natural angular velocity being set by the natural angular velocity setting function on the basis of the input oscillator signal; and an induction oscillator generation function of generating a first induction oscillator representing an elastic force by a virtual elastic element for inducing the user's motion so as to bring a value of the third motion oscillator measured by the motion oscillator measurement function close to a target value responsive to a target motion scale of the user according to the second oscillator generated by the second oscillator generation function and the natural angular velocity set by the natural angular velocity setting function, and generating the induction oscillator including the first induction oscillator.

17. The control program according to claim 16, providing the computer attached to the motion induction device with a function, as the motion oscillator measurement function, of measuring a time derivative of the third motion oscillator as a fourth motion oscillator, and as the induction oscillator generation function, of generating a second induction oscillator representing a damping force of a virtual damping element for inducing the user's motion so as to prevent an increase in absolute value of the third motion oscillator according to the second oscillator generated by the second oscillator generation function, the natural angular velocity set by the natural angular velocity setting function, and the fourth motion oscillator measured by the motion oscillator measurement function, and further generating the induction oscillator further including the second induction oscillator.

* * * * *